(12) United States Patent
Sengoku

(10) Patent No.: US 11,463,230 B1
(45) Date of Patent: Oct. 4, 2022

(54) ACCURATE PERIOD MEASUREMENT AND SYNCHRONIZATION THROUGH SENSOR STREAM INTERFACE

(71) Applicant: Apple Inc., Cupertino, CA (US)

(72) Inventor: Shoichiro Sengoku, Dublin, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/385,773

(22) Filed: Jul. 26, 2021

Related U.S. Application Data

(60) Provisional application No. 63/059,807, filed on Jul. 31, 2020.

(51) Int. Cl.
  *H04L 7/00* (2006.01)
  *H04L 67/12* (2022.01)

(52) U.S. Cl.
  CPC .......... *H04L 7/0008* (2013.01); *H04L 67/12* (2013.01)

(58) Field of Classification Search
  CPC .............................. H04L 7/0008; H04L 67/12
  See application file for complete search history.

(56) References Cited

U.S. PATENT DOCUMENTS

| | | | | |
|---|---|---|---|---|
| 4,232,197 A | * | 11/1980 | Acampora | H04B 7/2046 370/347 |
| 10,084,559 B1 | * | 9/2018 | Devineni | H04J 3/0661 |
| 2008/0075121 A1 | * | 3/2008 | Fourcand | H04J 3/0682 370/503 |
| 2010/0289921 A1 | * | 11/2010 | Napoli | H04N 1/00127 348/231.5 |
| 2011/0052206 A1 | * | 3/2011 | Zheng | H04J 3/0697 398/154 |
| 2017/0134619 A1 | * | 5/2017 | Narayanswamy | H04N 5/06 |

* cited by examiner

*Primary Examiner* — Jaison Joseph
(74) *Attorney, Agent, or Firm* — Brownstein Hyatt Farber Schreck, LLP

(57) ABSTRACT

Disclosed herein are systems, methods, and devices for sensor systems, in which one or more sensors are linked with a host processor. The sensors may transmit a sequence of frames, such as video frames to the host processor. The methods may include determining and/or adjusting a period or frequency of a first clock or oscillator in a sensor device, based on two signals applied by the sensor to a sequence of frames. The host processor may use its own clock or oscillator to determine an elapsed time between the two signals to determine the period or frequency of the first clock and may apply an adjustment to the sensor's clock. Other embodiments are directed to sensor systems in which two or more sensors may transmit respective sequences of frames to the host processor. The methods may provide the host processor a means to synchronize transmission of the frames from the sensors. The systems, methods, and devices may avoid the need for dedicated timing or synchronization lines.

20 Claims, 12 Drawing Sheets

ACCURATE PERIOD MEASUREMENT AND SYNCHRONIZATION THROUGH SENSOR STREAM INTERFACE

CROSS-REFERENCE TO RELATED APPLICATION

This application is a nonprovisional of, and claims the benefit under 35 U.S.C. § 119(e) of, U.S. Provisional Patent Application No. 63/059,807, filed Jul. 31, 2020, the contents of which are incorporated herein by reference as if fully disclosed herein.

FIELD

The present disclosure generally relates to systems, methods, and devices in which sequential data, such as video or image frame data, is generated at one or more sensors and received by a second device, such as a host processing device, and more particularly to the use of separate timing mechanisms, such as oscillators, in a sensor and a host processing device to synchronize such data.

BACKGROUND

Many types of electronic devices include one or more sensors. Examples of sensors include image sensors such as cameras, which may be part of image capture systems, audio sensors such as microphones, thermal sensors, and antennae receiving electromagnetic signals, among others. Such electronic devices may also include or be linked with a host processor, such as a microcomputer, microprocessor, control processor, or other processing or computational devices, that receives signals sent from the one or more sensors. The host processor may be communicatively linked with the one or more sensors and may control certain operations of the one or more sensors. The host processor may provide signal analysis, signal processing, or other operations on the received signals for use by other devices or end users.

Such electronic devices may generate one or more timing signals to control and/or synchronize operations of electronic or other components, such as operations of the sensors and the host processor. In electronic devices with sensors and an associated host processor, the sensors may transmit data to the host processor as a sequence of symbols. Correct reception by a host processor of the transmitted symbols may be based on having synchronization of operations between the one or more sensors and the host processor. A host processor may provide synchronization by generating timing or synchronization signals, such as by use of an accurate piezoelectric oscillator, and transmitting the timing or synchronization signals to the one or more sensors.

Some sensor systems may have multiple sensors, for example, a stereo camera system having two image sensors. In some sensor systems, the multiple sensors may also transmit their respective obtained sensor data as a sequence of frames to a host processor. Correct operation of such sensor systems may be based on concurrent or synchronized reception of the multiple sequences of frames at the host processor. A host processor may generate a synchronization signal and transmit it to the multiple sensors to provide synchronization. Alternatively, a single sensor may generate a synchronization signal and transmit it to the other sensors.

Such systems and methods may need to use at least one timing and/or synchronization connection line or channel with each of the sensors. It may be that providing connection lines or channels between sensors and host processors may add cost and complexity and take up available space for other parts of the electronic devices. Further, providing a dedicated or master clock timing line would increase power consumption.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Disclosed herein are systems and methods directed toward electronic devices having one or more sensors communicatively linked with a host processor that receives the acquired sensor data. The systems and methods generally relate to timing and synchronization of the signals between the one or more sensors and the host processor.

A first embodiment describes a sensor system that includes a host processor that contains a host clock. The sensor system also includes a sensor that has a sensor clock, with the sensor communicatively linked with the host processor. The sensor is operable to transmit a sequence of frames to the host processor, apply a first marker to a first frame in the sequence of frames, and apply a second marker to a second frame in the sequence of frames, the second frame occurring subsequent to the first frame. The host processor is operable to determine a measured elapsed time between a reception of the first marker of the first frame and a reception of the second marker of the second frame. The determination of the elapsed time may be based at least in part on the host clock. The host processor may also be operable to determine whether a discrepancy exists between the measured elapsed time and an expected elapsed time, and in the case that a discrepancy does exist, transmit an adjustment signal to the sensor to adjust an operation of the sensor clock. The adjustment signal may cause an adjustment to a period of the sensor timing signal.

In a second embodiment, a method of operation is described by which a host processor, which is communicatively linked with a sensor, may adjust a timing operation of the sensor. The method may include the operations of receiving a sequence of frames from the sensor, identifying a first frame in the sequence of frames, the first frame having a first marker, and identifying a second frame, occurring subsequent to the first frame, in the sequence of frames, the second frame having a second marker. The method may also include determining a measured elapsed time between the first marker and the second marker based at least in part on a host clock of the host processor, and determining a discrepancy between the measured elapsed time and an expected elapsed time between the first marker and the second marker. The method may also include transmitting an adjustment signal to the sensor to cause an adjustment of a timing operation of the sensor.

In a third embodiment, a sensor system is described that includes a host processor, a first sensor communicatively linked with the host processor, and a second sensor communicatively linked with the host processor. The host processor may include a host timing counter, the first sensor may include a first sensor timing counter, and the second sensor may include a second sensor timing counter. The first sensor may be operable to transmit a first sequence of frames to the host processor over a first communication channel; and apply a start marker to a first frame of the first sequence of frames; the second sensor may be operable to transmit a second sequence of frames to the host processor over a second communication channel, and apply an end marker to first frame of the second sequence of frames subsequent to the first sensor applying the start marker to the first frame of the first sequence of frames. The host processor may be operable to initiate a counting by the host timing counter upon detection of the start marker in the received first frame of the first sequence of frames; cease the counting by the host timing counter upon detection of the end marker in the received first frame of the second sequence of frames; determine whether an offset exists between the first sensor timing counter and the second sensor timing counter; and in the case that an offset exists, transmit to at least one of the first sensor and the second sensor an adjustment to be applied to at least one of the first sensor timing counter and the second sensor timing counter.

BRIEF DESCRIPTION OF THE DRAWINGS

The disclosure will be readily understood by the following detailed description in conjunction with the accompanying drawings, wherein like reference numerals designate like structural elements.

Figure 1A:
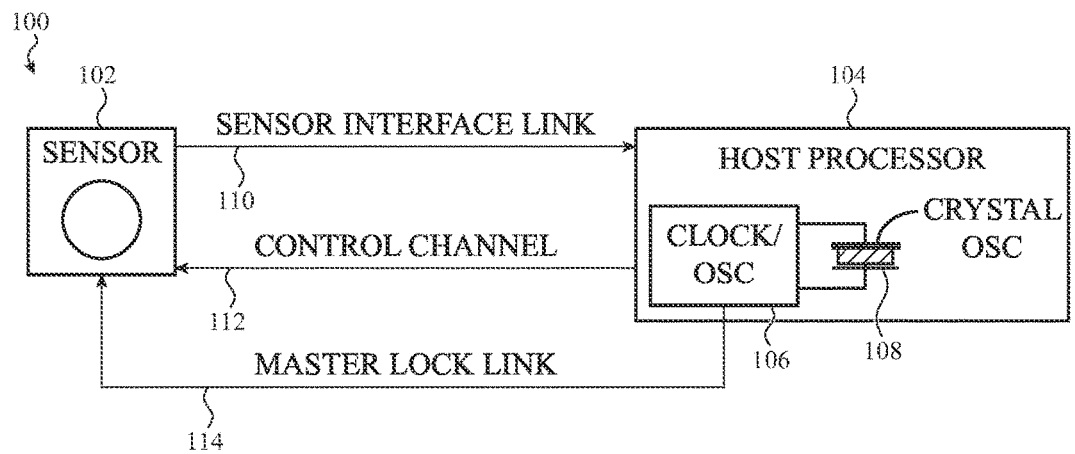
FIG. 1A illustrates a sensor system in which a sensor is linked with and controlled by a host processor.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The embodiments described herein are directed to systems, methods, and devices for sensor systems, in which one or more sensors (e.g., image sensors, including image sensors that record video sequences) are communicatively linked with and receive control commands from a host processor, and transmit sensor data to the host processor.

In one set of embodiments, sensor systems may include a sensor that transmits its acquired sensor data to a host processor by transmitting its acquired data as a sequence of frames. As used herein, a "frame" refers to an organized pattern of data symbols, such as a formatted packet of data symbols, and may have a designed length or number of data symbols. Each frame may be transmitted as a series of electronic or optic symbols (such as voltage or optical pulses, sine waves, or other signaling formats), each symbol sent during a symbol time interval. The symbols may be transmitted at an intended period (or frequency) for the system. In this set of embodiments, the sensor may have an internal clock, such as may be driven by an electronic oscillator, which may produce a timing signal or other timing operation internal to the sensor. This sensor-generated timing signal may be used for timing and control of the transmission of the frames. The frames may be transmitted over a communication link to a host processor.

The host processor may provide various signal processing operations on the sensor data obtained from the frames. The host processor may have its own internal clock producing a separate timing signal, such as by use of an accurate piezoelectric oscillator. The host processor's separate timing signal may be used for synchronization and/or timing of the host processor's internal operations, such as the timing of digital components.

Correct reception by the host processor of the sensor's transmitted symbols or frames may be based on having synchronization or coordination between the sensor's and the host processor's operations. While the sensor system could be equipped with dedicated communication links or transmission lines for transmitting the host processor's timing or synchronization signals to the sensor, this could add complexity and cost to the sensor system, as well as increase power consumption. In this set of embodiments the host processor's separate timing signal may be used as a check on the timing or accuracy of the sensor's timing signal. If the host processor detects a discrepancy or error in the sensor's timing signal, such as an error in a frequency or period, the host processor may issue an adjustment signal to the sensor to enable the sensor to adjust the timing of its timing signal or timing operation, such as by modifying an electrical parameter of an oscillator of the sensor.

This may allow the sensor to use a less accurate clock or oscillator than that of the host processor. As an example, the sensor oscillator may be a resistance-capacitance oscillator, or a voltage-controlled oscillator run from a battery. Parameter or battery voltage drift may be compensated for by occasional adjustment signals from the host processor to the sensor. The sensor may thus be simpler or more compact.

The embodiments may also allow the sensor system to avoid a need for a dedicated timing channel from the host processor to the sensor. This may make for simpler design of the system. A host processor may be able to use an existing control channel (e.g., on/off or similar signals) to maintain timing synchronization with the sensor without adding an additional communication line.

In some of these embodiments, the check on the sensor's timing accuracy is performed by determining an elapsed time between two marker signals or data packets that the sensor applies to separated frames within the sequence of frames it transmits. The host processor may know or calculate an expected value for the elapsed time, and may compare that to the observed elapsed time between the two marker signals. The host processor may use a host timing counter together with the host's timing signal to calculate the observed elapsed time.

In another set of embodiments, sensor systems are described that have multiple sensors communicatively linked over respective communications channels with a host processor. The sensors may transmit their respective data to the host processor as sequences of transmitted frames. An example of such a sensor system is a stereo image capture system, in which there are two cameras differently positioned to view a scene, and that capture simultaneous images thereof. These pairs of images (one from each camera) may be transmitted to a host processor. Such a stereo image capture system may be used as a video capture system in which multiple pairs of images are captured sequentially at a periodic rate and transmitted as sequences of frames. The frames containing the respective images may be expected to arrive at a host processor at nearly the same time.

In sensor systems in which multiple sensors transmit sensor or other data as respective sequences of frames, simultaneous (to within a system tolerance) transmission of the frames from the sensors may be needed to provide a desired sensor system performance. While synchronization of such frame transmissions across the sensors could be provided using synchronization signals on a dedicated synchronization line or channel, the embodiments disclosed herein may obviate a need for such a dedicated channel, and so reduce system complexity.

In certain of these embodiments, an initiation command sent from a host processor to the sensors initiates a process whereby a first of the sensors applies a start marker signal to a frame of its sequence of transmitted frames. The remaining sensors apply respective end marker signals to respective frames that occur after a given delay after reception of the initiation command, such as after transmission of a fixed number of frames have been transmitted.

The host processor, such as by use of a host timing counter using a timing signal generated by a host clock, may calculate a difference between an expected arrival time and an observed arrival time of the end marker signal in each remaining sensor's sequence of transmitted frames. The time difference may be correlated with an amount of time by which frame transmissions lead or lag the frame transmissions of the first sensor. The host processor may then transmit commands to the remaining sensors to cause them to insert an appropriate time delay between transmissions of frames to produce synchronization of the transmissions of the frames across all sensors.

These and other embodiments are discussed below with reference to FIGS. 1A-7B. However, those skilled in the art will readily appreciate that the detailed description given herein with respect to these Figures is for explanatory purposes only and should not be construed as limiting.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

FIGS. 1A-2B illustrate block diagrams and signal timing diagrams of exemplary implementations of sensor systems having at least one sensor and a host processor. In these implementations there may be either of a dedicated timing line or a synchronization line between various components. Various embodiments described in relation FIGS. 3A-7B are directed to sensor systems and their methods of operation in which such dedicated timing lines or synchronization lines may not be included.

FIG. 1A illustrates a block diagram of a sensor system 100 that includes a sensor 102 communicatively linked with a host processor 104. The sensor 102 and the host processor 104 may be a single unit (such as an integrated circuit), or may be separated units within a single device, such as separate components on a printed circuit board, or separated units having communication links, such as one or more wired connections, fiber optic or coax cable connections, or wireless connections.

The sensor 102 may be an image sensor, such as a video sensor, or another type of sensor. Other types of sensors include microphones to obtain audio data, thermal sensors, and antennae that detect and/or receive parts of the electromagnetic spectrum, among others. As used herein, a "sensor" refers to a device that measures and/or records data about an aspect of a physical environment, or a person or object in the environment. A sensor may include associated electronics or other components as needed for obtaining and transmitting the data, such as batteries or other power sources, clocks, buffers, amplifiers, processors (e.g., microprocessors, control units, etc.), among others. The sensor 102 may transmit its obtained sensor data (e.g., image data) to the host processor 104 over the sensor interface link 110. The sensor data may be transmitted as a sequence of frames, as described further below. Examples of technologies that may be used for the sensor interface link 110 include: PCI Express, USB, VESA Display Port, VESA MDDI, MIPI I3C, MIPI D-PHY/C-PHY/M-PHY, among others.

The host processor 104 may include processing components, such as described above, to process and/or analyze the received sensor data. Such processing may include image and/or video reconstruction, format conversion, noise cancellation, error correction, and other procedures.

The host processor 104 may include an oscillator 108 used by a clock 106. The oscillator 108 and clock 106 may be a single unit. The oscillator 108 may be a piezoelectric crystal oscillator, a voltage-controlled oscillator, or another type of oscillator. The output of the oscillator 108 may be a voltage, current, or other time-varying electric or electromagnetic signal. The clock 106 may use the output of the oscillator 108 to produce a clock signal, such as a square wave, to provide timing and/or synchronization to various components within the host processor 104 and to other devices to which the host processor 104 may be linked. The clock signal may be a periodic signal with an accurately controlled period, such as may be provided by a temperature-controlled crystal oscillator.

The host processor 104 may provide the sensor 102 with a timing signal from the clock 106 over the master clock link 114. The master clock link 114 may be a dedicated connection, such as a wire link, a printed circuit board trace, a fiber optic link, or the like. The sensor 102 may use the timing signal as a source for an internal timing signal for its internal components, and to synchronize transmissions of the sensor data on the sensor interface link 110 with the host processor 104.

There may be a control channel 112 between the host processor 104 and the sensor 102. The host processor 104 may transmit command and control signals to the sensor 102 over the control channel 112 to modify or control operation of the sensor 102. Examples of such controlled operations include starting/stopping data sensing (e.g., video recording), adjusting focus of a lens, adjusting color balance, sending test frames, modifying timing or synchronization of sensing, among other possible operations.

Figure 1B:
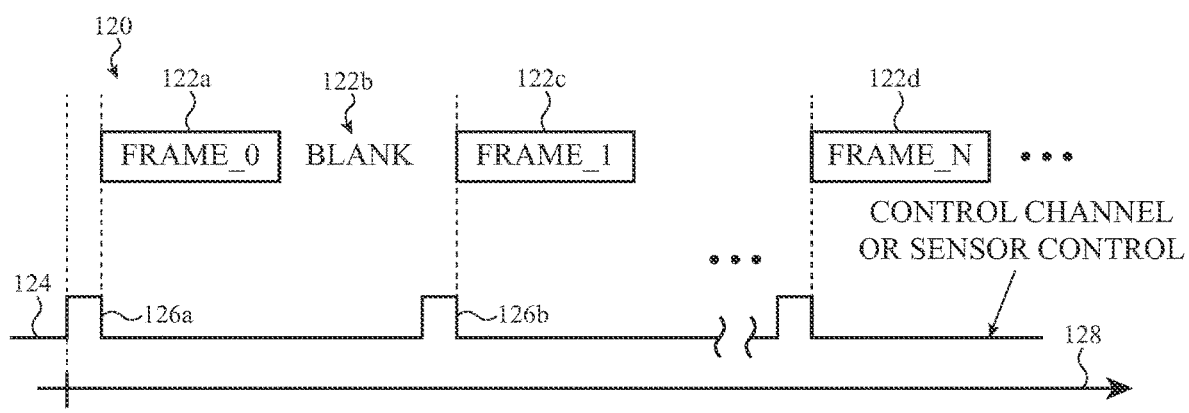
FIG. 1B illustrates a time sequence of frames, such as may be transmitted from a sensor to a host processor.

FIG. 1B illustrates a timing diagram 120 of an exemplary transmission of a sequence of frames 122a, 122c, and 122d from the sensor 102 to the host processor 104, over time 128, in the sensor system 100. The timing line 124 shows periodic pulses 126a and 126b that cause respective transmissions of frames 122a and 122c. The periodic pulses 126a, 126b, etc., are timed to allow for a blank section 122b to occur after transmission of FRAME_0 122a and before transmission of FRAME_1 122c. There may be formatting or other data transmitted in the blank section 122b that is separate from data transmitted in the frames 122a, 122c, and 122d. The timing line 124 may be the control channel 112 or the master clock link of the sensor system 100, or another timing line of the sensor 102.

Figure 1C:
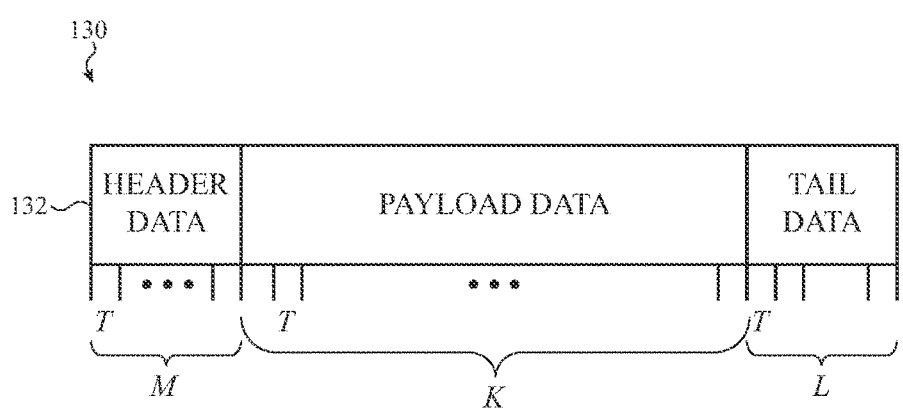
FIG. 1C illustrates an example of the data sections within a frame, such as may be transmitted from a sensor to a host processor.

FIG. 1C illustrates an example of a format 130 of a frame 132, such as may be transmitted in the sensor system 100 from the sensor 102 to the host processor 104. The frame 132 may include a given number of individual electric or electronic signals, each sent within a symbol time interval of duration T. In the exemplary format 130 of frame 132, there are an initial M-many symbol time intervals for header data that may specify format information, frame initiation, sensor identification, time stamp data, or other information. In the exemplary format 130 of the frame 132, there is a second, subsequent field of payload data (such as video image data) that is transmitted over K-many symbol time intervals. As used herein, "subsequent" refers to an event or action occurring at a later time than a preceding event or action. In the exemplary format 130 of frame 132, there is a third and final section of tail data, such as may include error correction data, which is transmitted in L-many symbol time intervals.

Within each symbol time interval of the frame 132, a particular signaling method may be used to transmit a given quantity of data. As an example, within each symbol time interval a single bit may be transmitted, such as on/off signaling within a fiber optic link, or binary phase shift keying (BPSK). Alternatively, within each symbol time period, a multi-bit signaling method may be used, such as quadrature phase shift keying (QPSK) that transmits two bits, 16-QAM, or another signaling method.

Figure 1D:
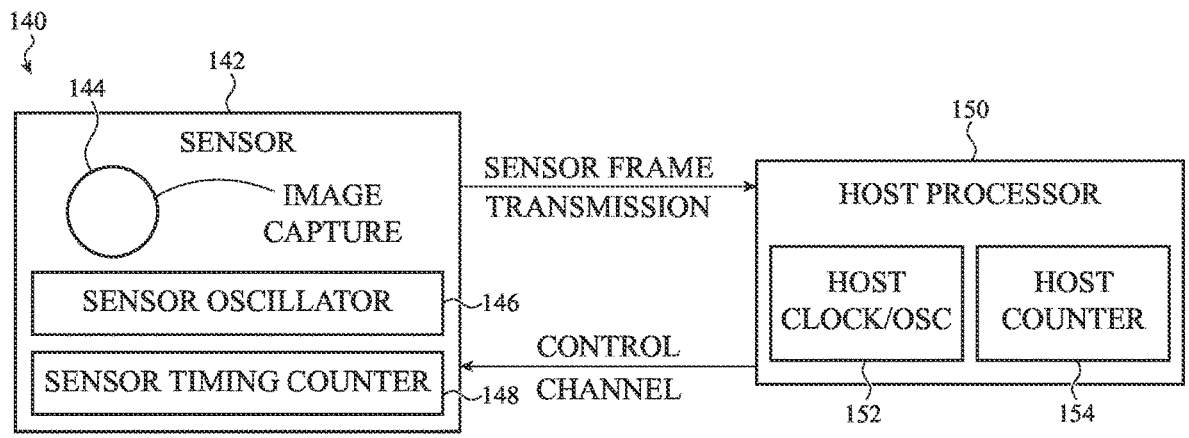
FIG. 1D illustrates a sensor system in which a sensor has an internal oscillator and timing counter, and is linked with and controlled by a host processor.

FIG. 1D shows another example of a sensor system 140 in which a host processor 150 is communicatively linked with a sensor 142. As previously described in the sensor system 140, the sensor 142 and the host processor 150 may be a single unit or device, or may be separate components. The host processor 150 may include host clock/oscillator 152, which may include an oscillator and a clock that uses the oscillator's output to generate a timing signal, such as a square wave, for at least the host processor 150. The host processor 150 may also include a host timing counter 154 that may be operable to generate a running count or calculation of a number of pulses of the timing signal generated by the host clock/oscillator 152.

As used herein, a "clock/oscillator," or just "clock" refers to a device having a first component (such as an oscillator) producing a first repeating, time-varying signal. Examples include, but are not limited to, RC oscillator circuits, LC oscillator circuits, transistor or op-amp circuits (e.g., a Colpitts or a Clapp oscillator), and piezoelectric crystal circuits. The period or the frequency of the oscillator's time-varying signal may be controllable through control of a value of one its internal components (e.g., resistance, input voltage, inductance, capacitance, etc.). The clock/oscillator may also have associated components (e.g., buffers, comparators, etc.) to produce a repeating, time-varying output signal. The output signal may be a square wave that may be used for timing operations of digital or other components of a sensor system. The output signal may have a period different from that of the oscillator, as may occur if the associated components include a pulse counter or a frequency divider circuit. As an example, a piezoelectric crystal oscillator may produce an oscillatory voltage at 20 MHz (and so have a period of 1/20 MHz=0.05 μsec), but an associated frequency divider circuit may produce an output signal in the form of a square wave with a period of 1 μsec. A clock/oscillator's output signal may be referred to as a "timing signal" in cases when it is used to control timing of operations of other components.

The sensor 142 may be an image capture system (e.g., a video recorder) having an image capture device 144, such as a lens and photodetector. The sensor 142 may also include a sensor clock/oscillator 146, which may be any oscillator and associated clock as described above. The sensor clock/oscillator 146 may provide a timing signal internal to the sensor 142. The sensor 142 may also include a sensor timing counter 148 to generate a running count or calculation of a number of pulses of the timing signal generated by the sensor clock/oscillator 146.

The sensor clock/oscillator 146 may be implemented with a simpler form of oscillator than a precision piezoelectric crystal oscillator, such as an RC oscillator, an LC oscillator, a ring oscillator, a voltage-controlled oscillator, or another type. Using a simpler form of oscillator may allow the sensor 142 to be more compact, use less power, have simpler electronics, be less expensive, or meet other design benefits or criteria.

As the sensor system 140 does not necessarily have a dedicated master clock link as in the sensor system 100 for coordinated or synchronized operation between the sensor 142 and the host processor 150, the periods or frequencies of the separate timing signals of the sensor 142 and the host processor 150 may need to have a fixed relationship or ratio.

Figure 1E:
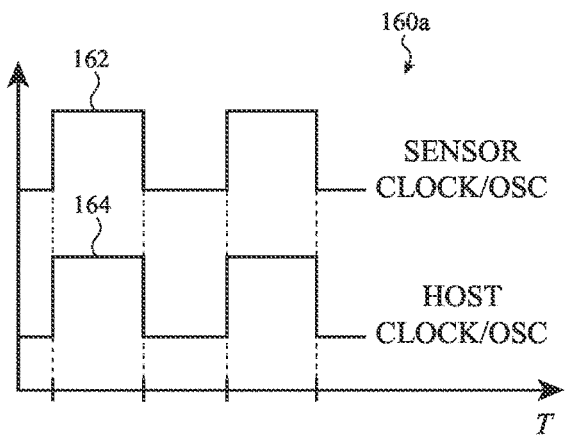
FIG. 1E illustrates a timing diagram in which a sensor's oscillation period matches a host processor's oscillation period.

FIG. 1E illustrates an example of a timing diagram 160a in which a sensor timing signal 162, which may be that of the sensor's oscillator, has the same period as a host timing signal 164. In the example shown, the sensor timing signal 162 and the host timing signal 164 are square waves at 50% duty cycle, though this is not required. Also, for simplicity, the sensor timing signal 162 and the host timing signal 164 are shown with the same phase, but this is also not required.

Figure 1F:
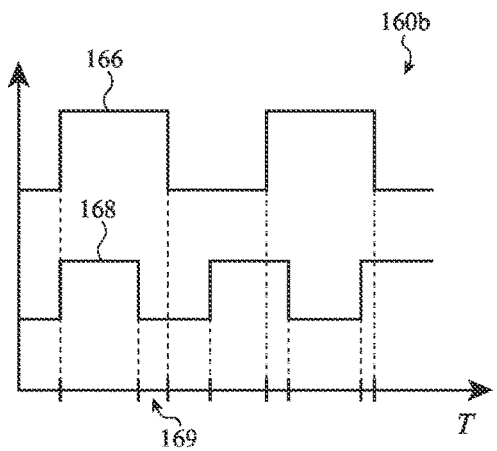
FIG. 1F illustrates a timing diagram in which there is a mismatch between a sensor's oscillation period and a host processor's oscillation period.

FIG. 1F illustrates a timing diagram 160b showing a drift that may have arisen between the period of the sensor timing signal 162 and the period of the host timing signal 164 of FIG. 1E. This may occur due to drift of component values within an oscillator, such as the resistance value R in an RC oscillator of the sensor 142 in the sensor system 140. In the example shown in FIG. 1F, the sensor timing signal 166 has a longer period than that of the host timing signal 168. The period difference 169 may cause problems for the transmission and reception of frames or signals at the host processor 150.

Figure 1G:
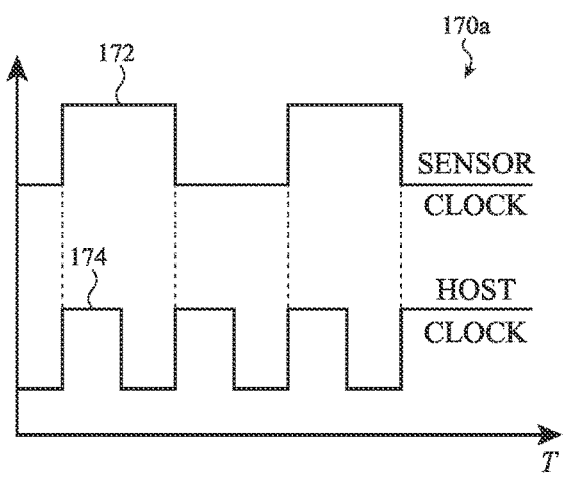
FIG. 1G illustrates a timing diagram in which a sensor's oscillation period matches half of a host processor's oscillation period.
Figure 1H:
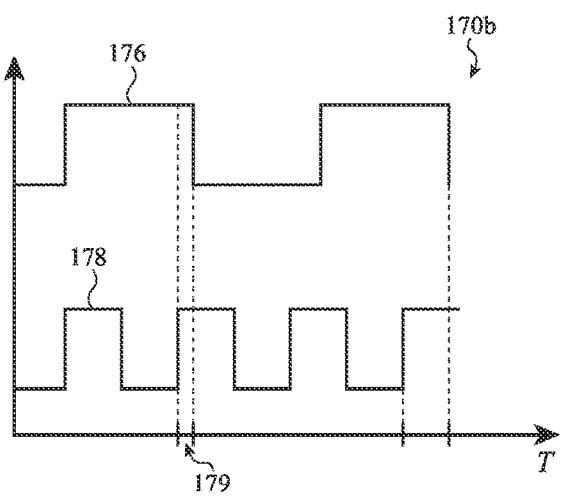
FIG. 1H illustrates a timing diagram in which a sensor's oscillation period has a mismatch with an intended half of a host processor's oscillation period.

FIG. 1G shows a timing diagram 170a in which there is a designed coordination or synchronization between a sensor timing signal 172 and a host timing signal 174 in which the respective designed periods are different. The sensor timing signal 172 and the host timing signal 174 may be their respective oscillator's output signal, or signals based thereon. For simplicity, the sensor timing signal 172 and the host timing signal 174 are shown with simultaneous rise times (e.g., in phase), but this is not required. This example is provided to illustrate that coordinated or synchronized operations, such as transmissions and receptions of frames, between the sensor 142 and the host processor 150, may be implemented in the sensor system 140 with different periods of the sensor timing signal 172 and a host timing signal 174. The sensor system 140 may be designed to operate with such different periods. FIG. 1H illustrates, however, that drift of the periods between a sensor timing signal 176 and a host timing signal 178 could create problems for coordinated or synchronized operations between the sensor 142 and the host processor 150. The period difference 179 may accumulate, potentially leading to problems for the transmission and reception of frames or signals at the host processor 150.

Embodiments described in relation to FIGS. 3A-4B below are directed to configurations of sensor systems, and their methods of operation, to reduce the potential for such problems.

Figure 2A:
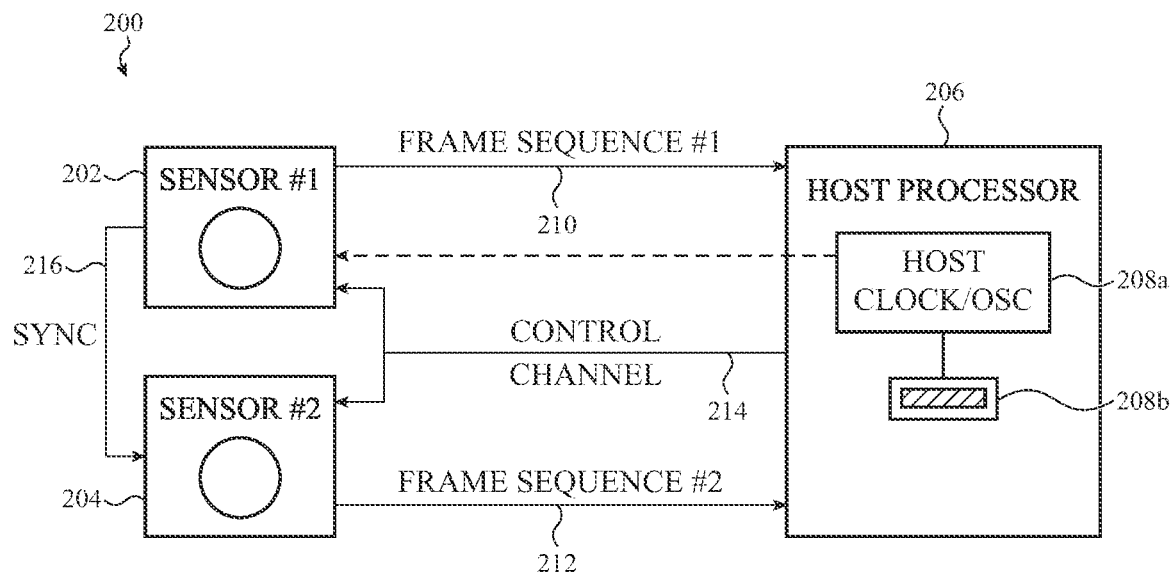
FIG. 2A illustrates a sensor system in which a host processor is linked with, and controls, two sensors, with synchronization of the two sensors controlled by the first sensor.

FIG. 2A illustrates a sensor system 200 that includes two sensors, sensor #1 202 and sensor #2 204, and a host processor 206. The host processor 206 may include a clock/oscillator 208a that may make use of a crystal oscillator 208b to produce a host timing signal with an accurate frequency or period. In one example, sensor #1 202 and sensor #2 204 may be part of a stereo video capture subsystem of the sensor system 200. The host processor 206 may transmit control signals (such as described above) over a control channel 214 to both of sensor #1 202 and sensor #2 204. Sensor #1 202 may transmit frame sequence #1 on a first communication channel 210 to the host processor 206. Sensor #2 204 may transmit frame sequence #2 on a second communication channel 212 to the host processor 206. The host processor 206 may transmit a host timing signal produced by the host clock/oscillator 208a to Sensor #1 202 over a clock link 218.

Sensor systems with multiple sensors may be based on synchronization or coordination of operation between the multiple sensors. In the example that the sensor system 200 is a stereo video system, sensor #1 202 and sensor #2 204 should ideally capture an image of a scene simultaneously, or nearly so. In the sensor system 200, synchronization between sensor #1 202 and sensor #2 204 may be implemented by a synchronization signal sent over sync channel 216.

Figure 2B:
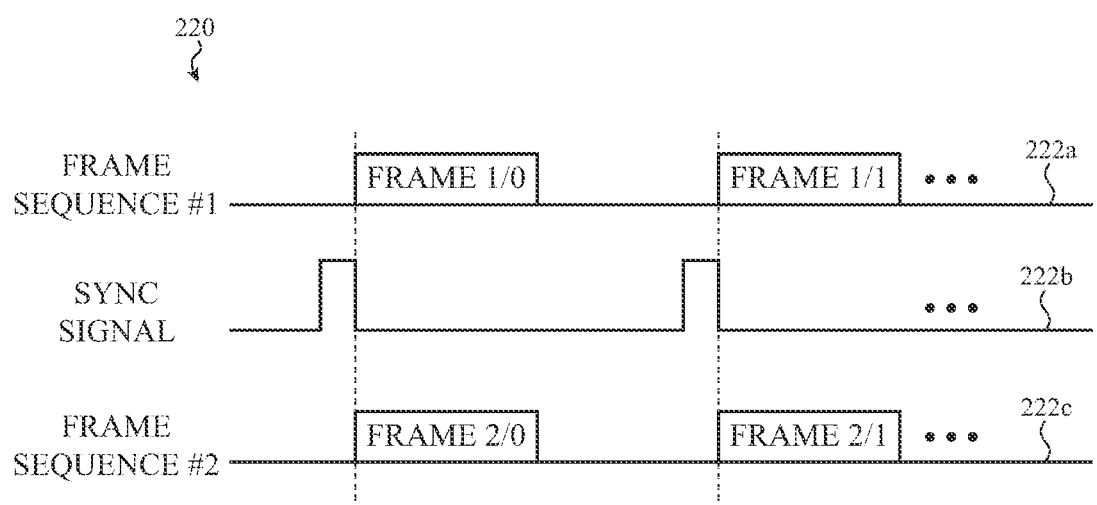
FIG. 2B illustrates a timing diagram of synchronized frame transmission, such as by the two sensors of FIG. 2A.

FIG. 2B shows a timing diagram 220 in which a synchronization signal 222b, transmitted over the sync channel 216 shown in FIG. 2A, allows for coordinated image capture and frame transmission from both sensor #1 202 and sensor #2 204 to the host processor 206. The synchronization signal 222b may be generated (as shown) by sensor #1 202 and transmitted over the sync channel 216 to sensor #2 204, or the synchronization signal 222b may be generated by a separate timing device. In the example shown, the pulses of the synchronization signal 222b trigger the starts of transmissions of the frames in frame sequence #1 222a and frame sequence #2 222c.

To implement the synchronization shown in FIG. 2B, the sensor system 200 includes the sync channel 216. Such a sync channel 216 may introduce extra wires or connections between the sensor #1 202 and sensor #2 204, and extra connection pins thereon. Further, if such a synchronization signal 222b is implemented as a single-ended signal, difficulties (such as delay times) may arise for accurate synchronization.

The embodiments described in relation to FIG. 5A-FIG. 7B below are directed to sensor systems with multiple sensors in which synchronization in transmissions of multiple frame sequences by the multiple sensors is obtained using counting methods implemented at the host processor.

Embodiments Directed to Sensor Timing Adjustment

Embodiments will now be described in relation to FIGS. 3A-4B for sensor systems in which a period of a sensor's timing signal may be controlled by a host processor, such as to synchronize with a period of the host's timing signal, without a requirement for a dedicated master clock link between the sensor and either a host processor or an external device. One skilled in the art will recognize that the described sensor systems may also include a master clock link, with the described embodiments used as checks or as alternatives in case of failure of the master clock link.

Figure 3A:
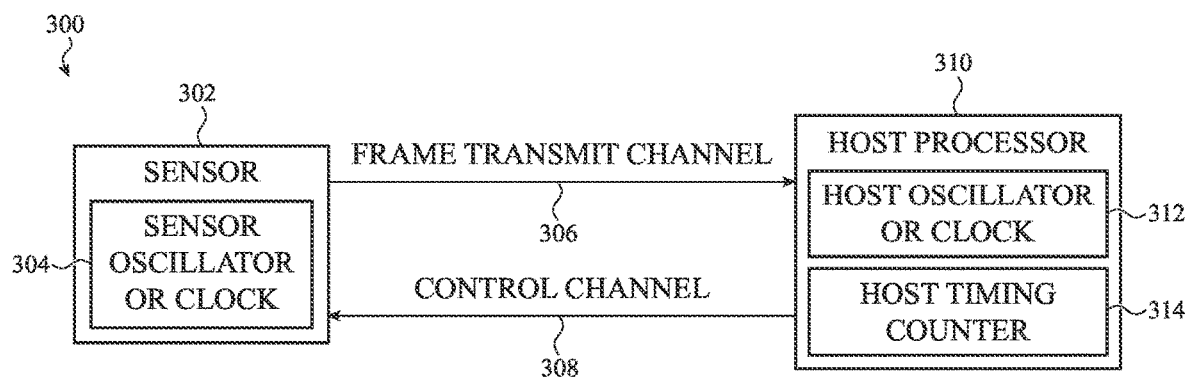
FIG. 3A illustrates a sensor system having a sensor linked with and controlled by a host processor, according to an embodiment.

FIG. 3A illustrates a block diagram of certain components and communication channels of a sensor system 300. The sensor system 300 may include a sensor 302, which may be any of the sensor types described previously. The sensor 302 may include a sensor clock/oscillator 304. The sensor clock/oscillator 304 may include an oscillator, such as any of the oscillators described previously, with the output of the sensor clock/oscillator 304 being a sensor timing signal.

The sensor system 300 may include a host processor 310, which may be a host processor as described previously. The host processor 310 may include its own clock/oscillator 312 to generate a host timing signal for at least some components of the host processor 310.

The host processor 310 may also include a host timing counter 314 which may generate, or may be operable to generate, a count based on the periods or clock cycles in either the host timing signal or in a received signal from a sensor. For example, the host timing counter 314 may, upon receiving an initiation command, begin a count of every period or clock cycle in the host timing signal thereafter, or may produce a count that is a factor of the total (e.g., one-half the total number of periods or clock cycles).

The sensor system 300 may include a frame transmit channel 306 over which the sensor 302 may transmit sensor data (e.g., image data) and other data to the host processor 310. The sensor 302 may transmit its sensor data and other data by organizing and formatting that data into a sequence of frames, such as described previously. The sensor system 300 may also include a control channel 308 over which the host processor 310 may send signals to the sensor 302, such as to control one or more operations or actions of the sensor 302.

The sensor system 300 may be designed or configured so that both the designed or intended periods of the sensor timing signal and the host timing signal are correlated in a known way to the sensor system 300, or at least to the host processor 310. As a first illustrative example, the sensor system 300 may be configured or designed so that the constituent symbols within each frame should have a duration T that is equal to the period of the host timing signal generated by the sensor clock/oscillator 312, such as shown in FIG. 1E. As a second illustrative example, the sensor system 300 may be designed so that the constituent symbols within each frame should have a duration T that is equal to twice the period of the host timing signal generated by host clock/oscillator 312, such as shown in FIG. 1G.

However, in the absence of a dedicated master clock line from the host processor 310 to the sensor, the duration time T of a symbol time interval of a frame may be based on a period of a sensor timing signal produced by the sensor clock/oscillator 304. For example, one symbol time interval of a frame may equal one period of the sensor timing signal, or alternatively, one symbol time interval of a frame may equal a fixed multiple of periods of the sensor timing signal. The sensor system 300 may be designed so that the period of the sensor timing signal generated by the sensor clock/oscillator 304 would have a known or designed ratio with the period of the host timing signal produced by the host clock/oscillator 312. For example, the period of each could be designed to have equal duration, or alternatively, the period of the sensor timing signal may be twice the period of the host timing signal. Other ratios may be used. The duration T may thus have a known relationship to the period of the sensor timing signal, and in turn to the period or frequency of the sensor clock/oscillator 304.

But due to component drift within the sensor clock/oscillator 304 or other error sources, the period of the sensor timing signal may change from a designed ratio with the period of the host timing signal. This in turn may alter the duration T of the symbol time intervals of the frames as they are received at the host processor 310. Uncorrected, this could lead to timing offset errors, as indicated in FIGS. 1F and 1H, or other errors in operation of the sensor system 300.

Figure 3B:
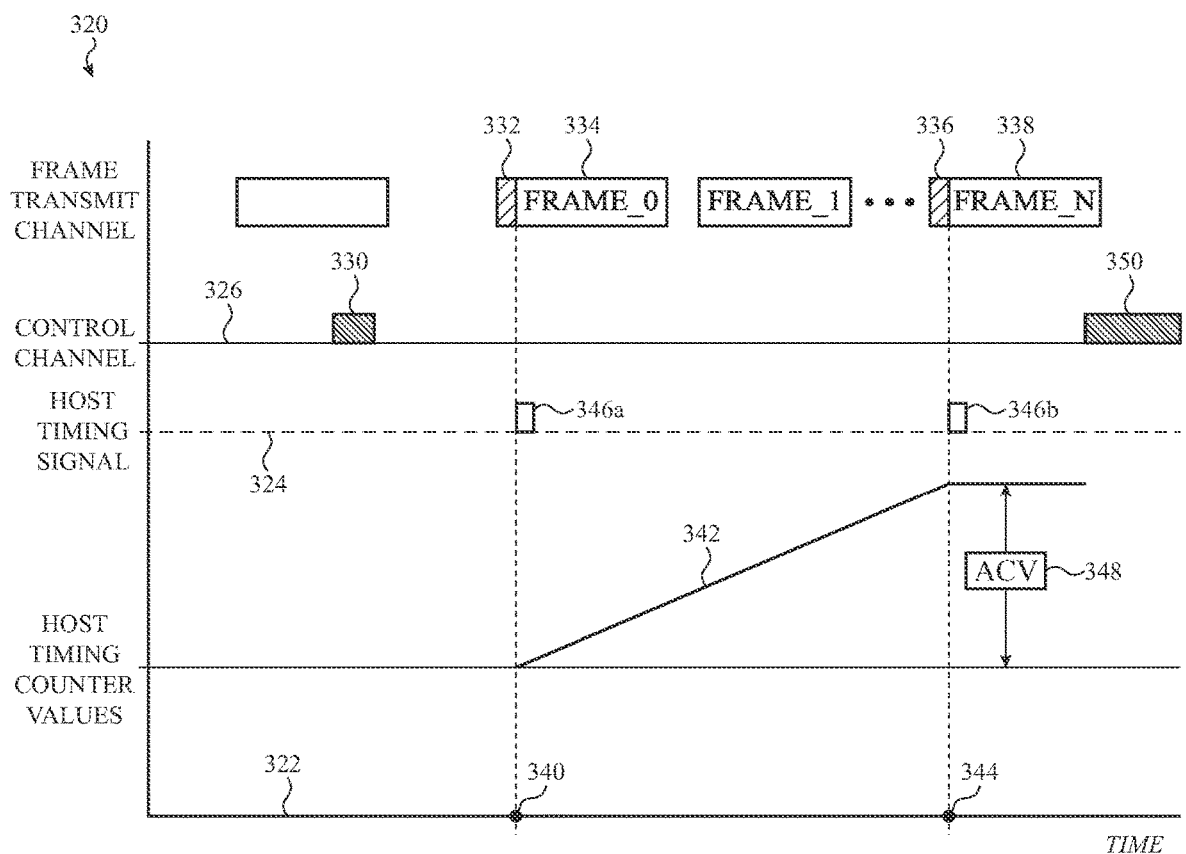
FIG. 3B illustrates a timing diagram of a method of sensor oscillator frequency control, according to an embodiment.

FIG. 3B shows a timing diagram 320 showing operations that may be used by the sensor system 300 to determine if symbol durations T within a transmitted frame are within a tolerance of a designed or intended value. The horizontal time axis 322 shows elapsed time, with the same time scale used on the horizontal axes of: the frame transmit channel 328, the control channel 326, and the host timing counter signal channel 324. The horizontal counter axis 323 has the same time scale as the time axis 322, with a value of the host timing counter 314 indicated vertically.

For simplicity of explanation in the following, it will be assumed that the designed or intended symbol duration T as transmitted by the sensor 302 is equal to the period of the sensor timing signal generated by the sensor clock/oscillator 304, and also equal to the period of the host timing signal generated by the host clock/oscillator 312. One skilled in the art will recognize how to adapt the following analysis for cases in which a design or intended period of the sensor timing signal differs from that of the host timing signal, with each differing from the symbol duration time T. As an example, an oscillator in the sensor clock/oscillator 304 may have a design frequency of 10 MHz, with the sensor clock/oscillator 304 producing an output square wave (50% duty cycle) sensor timing signal at 1 MHz (and so have a design period of 1 µsec). The sensor 302 may transmit each data symbol with a design duration of 20 µsec. The host clock/oscillator 312 may have an oscillator producing a periodic signal at a frequency of 50 MHz, with the host clock/oscillator producing an output host timing signal that is a square wave (50% duty cycle) at 20 MHz (so with a design period of 0.05 µsec). As designed, a data symbol received at the host processor 310 would occur over a span of 400 periods of the host timing signal. One skilled in the art will recognize how to apply conversion factors and other adjustments to the following analysis.

A sequence of frames is illustrated on the frame transmit channel 328 being transmitted from the sensor 302 to the host processor 310. The host processor 310 may transmit a start command 330 to the sensor 302, such as on the control channel 308. Thereafter, the sensor 302 applies a first marker 332 to FRAME_0 334. FRAME_0 334 may be the next frame in the sequence of frames following reception of the start command 330 by the sensor 302, or may be a later subsequent frame. The first marker 332 may be data included within FRAME_0 334, or may be prepended to FRAME_0 334 as a short data packet signal.

When the first marker 332 is detected, at time 340, by the host processor 310, the host processor 310 may send start signal 346a to the host timing counter 314. The host timing counter 314 may then initiate a counting of the number of symbol time intervals, such as the symbol time intervals shown in FIG. 1C, within the sequence of frames as the frames are received. Additionally or alternatively, the host timing counter 314 may initiate a counting of the periods (or multiple or fraction thereof) of the host clock/oscillator 312, or of another correlated signal. For simplicity of explanation, the counting by the host timing counter 314 will be described as counting the symbol time intervals. The host timing counter may also count the symbol time intervals that are between received frames, such as symbol time intervals of a blank section 122b. The number of symbol time intervals received between each frame may be a known or designed value for the sensor system 300.

After transmission by sensor 302 to the host processor 310 of a fixed number of frames and/or blank sections between frames, shown as N-many in FIG. 3B, the sensor 302 may apply, at end time 344, a second marker 336 to FRAME_N 338. As with the first marker 332, the second marker 336 may be a prepended packet with FRAME_N 338, or may be data contained within FRAME_N 338. Upon reception of the second marker 336, the host processor 310 may send a stop signal 346b to the host timing counter 314 that causes it to cease counting the number of symbol periods being received in the sequence of frames.

At cessation of counting, the host timing counter has recorded an actual count value (ACV) 348. The ACV value may be used to determine change or error, ΔT, of the symbol interval duration T from the design value.

In the following, $T_{ideal}$ denotes the ideal or design value of a symbol period, which in the assumption just discussed, equals the period of the host timing signal and the designed period of the sensor timing signal. The frequency then is $1/T_{ideal} = F_{ideal}$.

Under designed or ideal operation, after the host processor 310 has received the N-many frames, the ideal of expected value of the count of received symbols at the host timing counter 314 would be given by $X_{ideal} = N_{frame} \times C_{frame} \times T_{ideal}$, where $C_{frame}$ is the number of symbols per frame, which may include the blanking time between frames.

However, if sensor 302 has transmitted the symbols at a non-ideal symbol period $T_{actual}$, then $ACV = X_{actual} = N_{frame} \times C_{frame} \times T_{actual}$. The error ΔT in the actual symbol duration time from the ideal $T_{ideal}$ may then be calculated as:

$$\Delta T = (X_{ideal} - X_{actual})/(N_{frame} \times C_{frame}).$$

This error may be used by the host processor 310 to determine an adjustment signal 350 to send to the sensor 302 to cause the sensor timing signal to move to having the ideal or designed period $T_{ideal}$.

In some embodiments, the host processor 310 may use frequency measurements of the received signal, such as when the received signal is a sinusoid (e.g., the transmitted signal from the sensor uses either a wired or wireless transmission with BPSK signaling). The measured frequency of the received signal may then be compared with the frequency of the host timing signal (e.g., the reciprocal of the period). In such a case, an error in frequency of the received sequence of frames may be given by $\Delta F = F_{actual} - F_{ideal}$. The relationship between the per symbol period timing error and the error in the frequency may be given by:

$$\Delta T = T_{ideal} - T_{actual} = \Delta F/(F_{actual} \times F_{ideal}).$$

Variations on this embodiment may be implemented. In a first variation, the specific frames used during the counting, FRAME_0 334 to FRAME_(N−1), may not contain sensor data, but instead may have a specific set of symbols or data to facilitate the counting. One or both of the first and second markers may be included as part of their respective selected frames. The first marker may be included in a frame immediately prior to FRAME_0 334 to signal the host processor 310 and/or the host timing counter 314 to begin the counting at the start of the next frame, FRAME_0 334. The sensor timing signal adjustment process just described may be initiated by the host processor 310 on a regular schedule, or upon a determination that the process may be needed. Other variations within the scope of this disclosure will be clear to one skilled in the art.

Figure 4A:
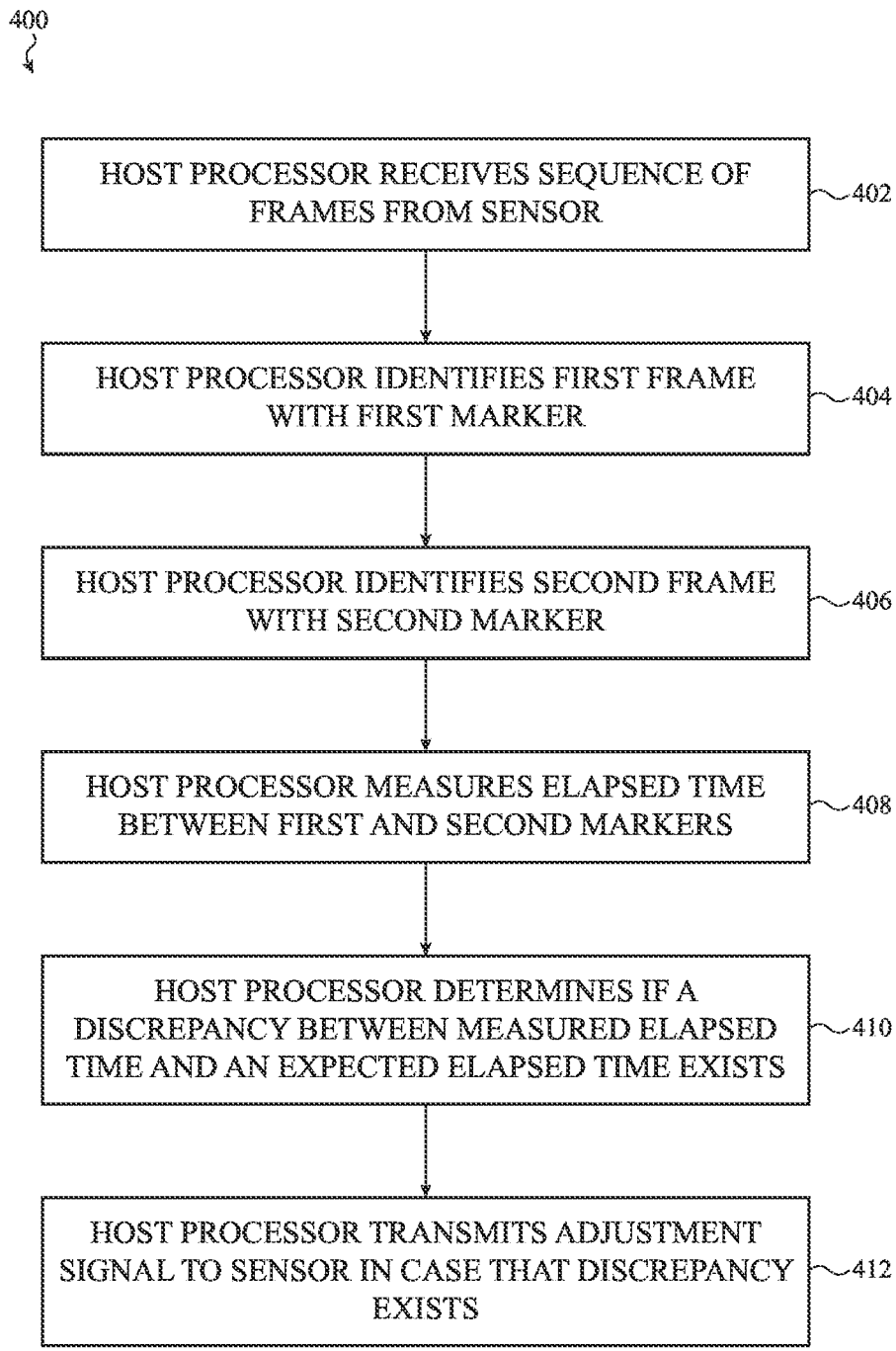
FIG. 4A is a flow chart of a method of sensor oscillator frequency control, according to an embodiment.

FIG. 4A is a flow chart of a method 400 that may be used in a sensor system, such as the sensor system 300, by which a host processor of the sensor system may provide adjustments to a sensor clock/oscillator of a sensor of the sensor system. The method may be performed by the sensor system according to a schedule, or when a determination is made that the sensor clock/oscillator should be adjusted for correct or improved performance of the sensor system.

At block 402, the host processor may begin to receive a sequence of frames transmitted from the sensor of the sensor system. The frames may be transmitted from the sensor over a fixed number of periods of a sensor timing signal generated by a sensor clock/oscillator that is of the sensor.

At block 404, the host processor identifies a first frame of the received sequence of frames having a first marker applied by the sensor. The first marker may be a data packet applied to the first frame, either prepended, or included as part of the internal data of the first frame, or applied in another way.

At block 406, the host processor identifies a second frame of the received sequence of frames, the second frame identifiable by a second marker applied to the second frame by the sensor and received at the host processor subsequent to the first frame being received.

At block 408, the host processor measures an elapsed time between reception of the first marker and the reception of the second marker. The measurement of the elapsed time may be based on a timing signal generated by a host clock/oscillator of the host processor.

At block 410, the host processor may determine if a discrepancy or difference exists between an expected elapsed time and the measured elapsed time between the reception of the first marker and the reception of the second marker.

At block 412, in the case that a discrepancy exists, the host processor may transmit an adjustment signal to the sensor of the sensor system. The adjustment signal may cause an alteration of the period of the sensor timing signal generated by the sensor clock/oscillator. The adjustment signal may alter the period of the sensor timing signal by altering a value of an electrical component of the sensor clock/oscillator.

Additional and/or alternative embodiments of the method 400 are also possible.

Figure 4B:
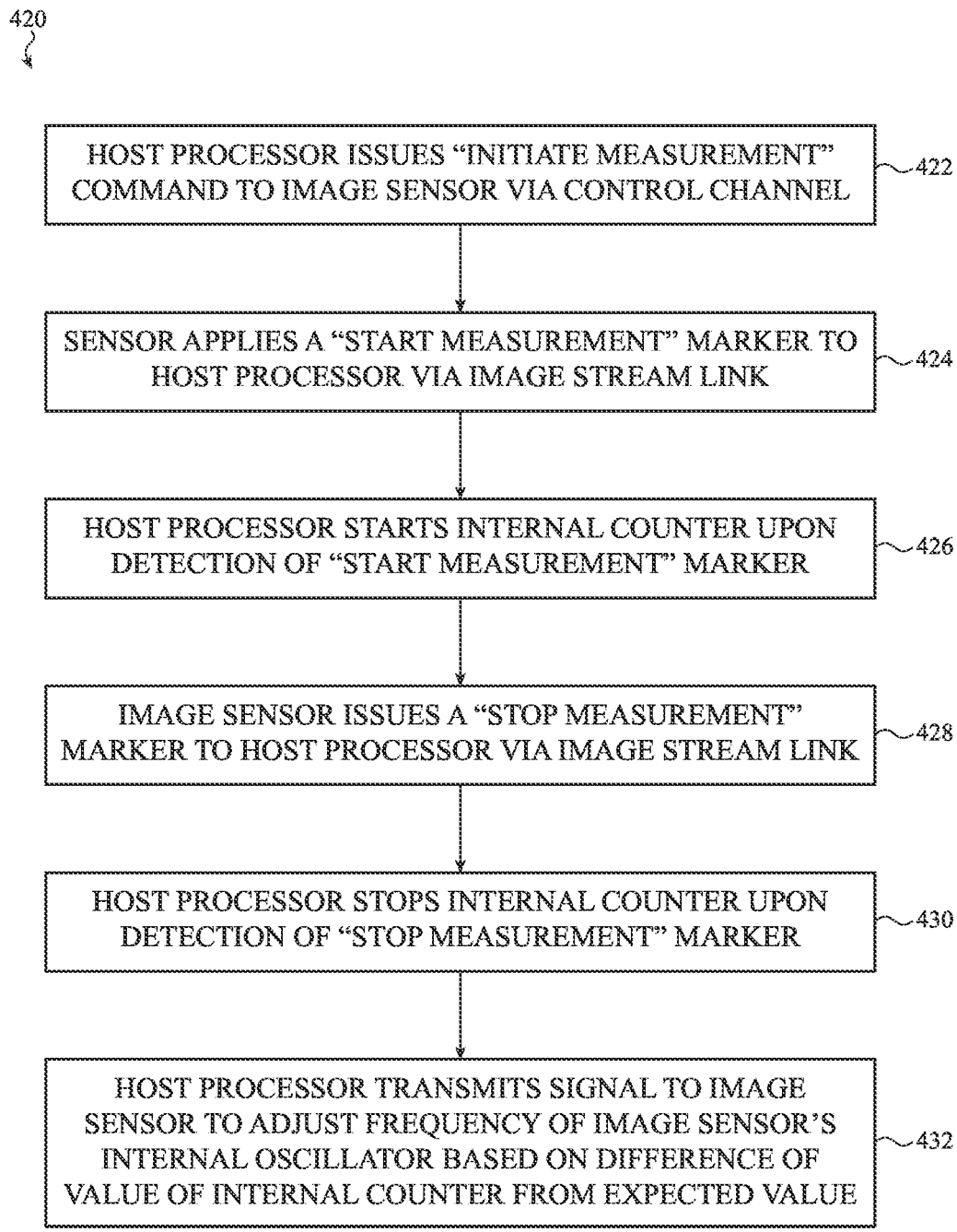
FIG. 4B is a flow chart of a method of sensor oscillator frequency control, according to an embodiment.

FIG. 4B is a flow chart of a method 420 that may be used in an image sensor system, such as a single camera video system, by which the image sensor system may provide adjustments to a sensor clock/oscillator of a sensor (e.g., a camera or other image capture device) of the image sensor system. While described in relation to an image sensor system, the method 420 may be used with other types of sensor systems, such as the various sensor systems previously mentioned.

In the method 420, the host processor may explicitly initiate the operations. This may be done on a scheduled basis by the image sensor system, or upon a determination that the method 420 would improve performance of the image sensor system.

At block 422 the host processor issues an Initiate Measurement command or instruction to the image sensor. This command may be transmitted over a control channel that provides a communication link between the host processor and the image sensor.

At block 424 the image sensor transmits a Start Measurement marker to the host processor over an image stream link that connects the image sensor to the host processor. The Start Measurement marker may be applied to a frame of a sequence of frames transmitted by the image sensor to the host processor, or may be a separate, specifically formatted signal sent by the image sensor to the host processor.

At block 426, upon detection of the received Start Measurement marker, the host processor starts an internal counter or timing operation. The internal counter or timing operation may be based, at least in part, on an internal timing signal generated by a clock/oscillator of the host processor, or may use another timing signal, such as may be provided by a clock signal generated external to the host processor.

At block 428 the image sensor transmits a Stop Measurement marker to the host processor over the image stream link subsequent to having sent the Start Measurement marker. The time from transmission of the Start Measurement marker to transmission of the Stop Measurement marker may be based, at least in part, on a frequency (or a period) of a timing signal generated by a clock/oscillator of the image sensor. The Stop Measurement marker may be applied to a frame of the sequence of frames, or may be a separate, specifically formatted signal sent by the image sensor to the host processor.

At block 430, upon detection of the received Stop Measurement marker, the host processor stops the internal counter or timing operation.

At block 432, the host processor may transmit a signal to the image sensor to adjust the frequency of the timing signal generated by the image sensor's clock/oscillator, e.g., by adjusting a parameter value of an electronic component or applied voltage in the image sensor's clock/oscillator. The host processor's signal to adjust the frequency may be based on a difference between: (i) an expected value of elapsed time from detection of the Start Measurement marker to the detection of the Stop Measurement marker, and (ii) the detected value of the elapsed time from detection of the Start Measurement marker to the detection of the Stop Measurement marker, as determined by the internal counter or timing operation of the host processor.

Embodiments for Frame Synchronization

In another family of embodiments, sensor systems and methods of their operations are described for synchronizing frame transmission between two or more sensors and a host processor.

Figure 5A:
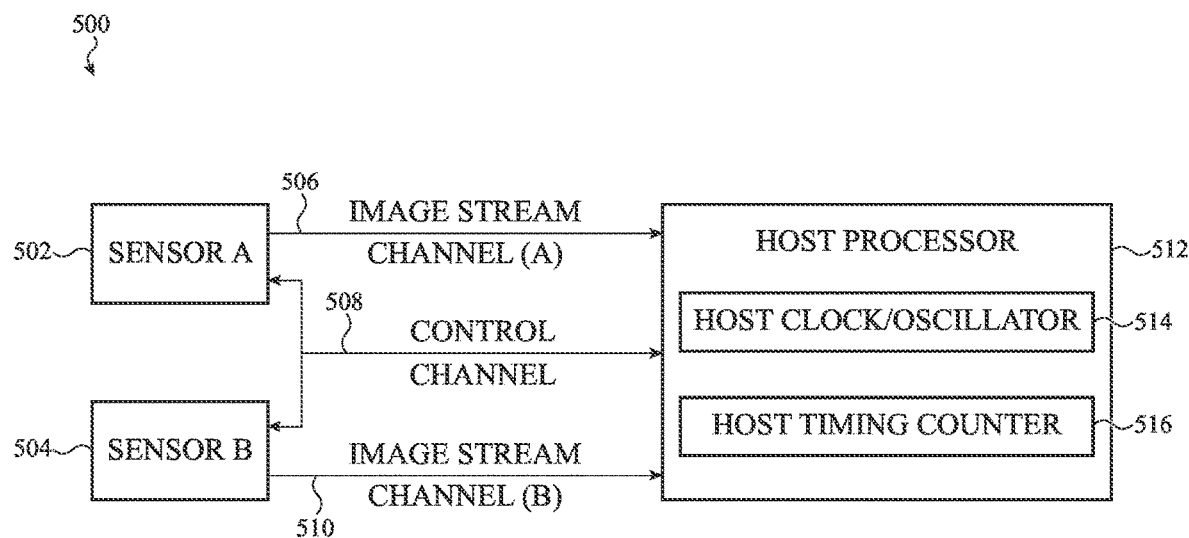
FIG. 5A illustrates a block diagram of a sensor system, according to an embodiment.

FIG. 5A illustrates a block diagram of some components of a sensor system 500. The sensor system includes at least two sensors, such as a first sensor (referred to as sensor A 502) and a second sensor (referred to as sensor B 506). In some embodiments, sensor system 500 may be a stereo image system. The sensor system 500 also includes a host processor 512 that may include a host clock/oscillator 514 and a host timing counter 516, each of which may be as described above. The host processor 512 may be communicatively linked with sensor A 502 and sensor B 506 by a control channel 510 over which the host processor 512 may transmit operational, control, or other signals to sensor A 502 and sensor B 506.

Sensor A 502 may transmit sensor data or other data to the host processor 512 over the stream channel A 505. Timing of the transmissions by sensor A 502 may be controlled by a timing signal generated by the sensor A clock/oscillator 503. Sensor A 502 may include sensor A timing counter 504. Sensor B 506 may transmit sensor or other data to the host processor 512 over the stream channel B 509. Timing of the transmissions by sensor B 506 may be controlled by a timing signal generated by the sensor B clock/oscillator 507. The transmissions may be as respective sequences of frames, as previously described. Sensor B 506 may include sensor B timing counter 508.

The sensor system 500 may be configured without a dedicated synchronization line or channel, either from the host processor 512 to either or both of sensor A 502 and sensor B 506, or from sensor A 502 and sensor B 506, or from sensor B 506 and sensor A 502. The sensor system 500 may be able to obtain synchronization of reception of the first and second sequences of frames using the following process. To use the following process, the sensor system 500 may have adjusted the timing or periods of the sensor timing signals of each of sensor A 502 and sensor B 506. This may have been achieved by any of the embodiments described above in relation to FIGS. 3A-4B, or by another method.

Figure 5B:
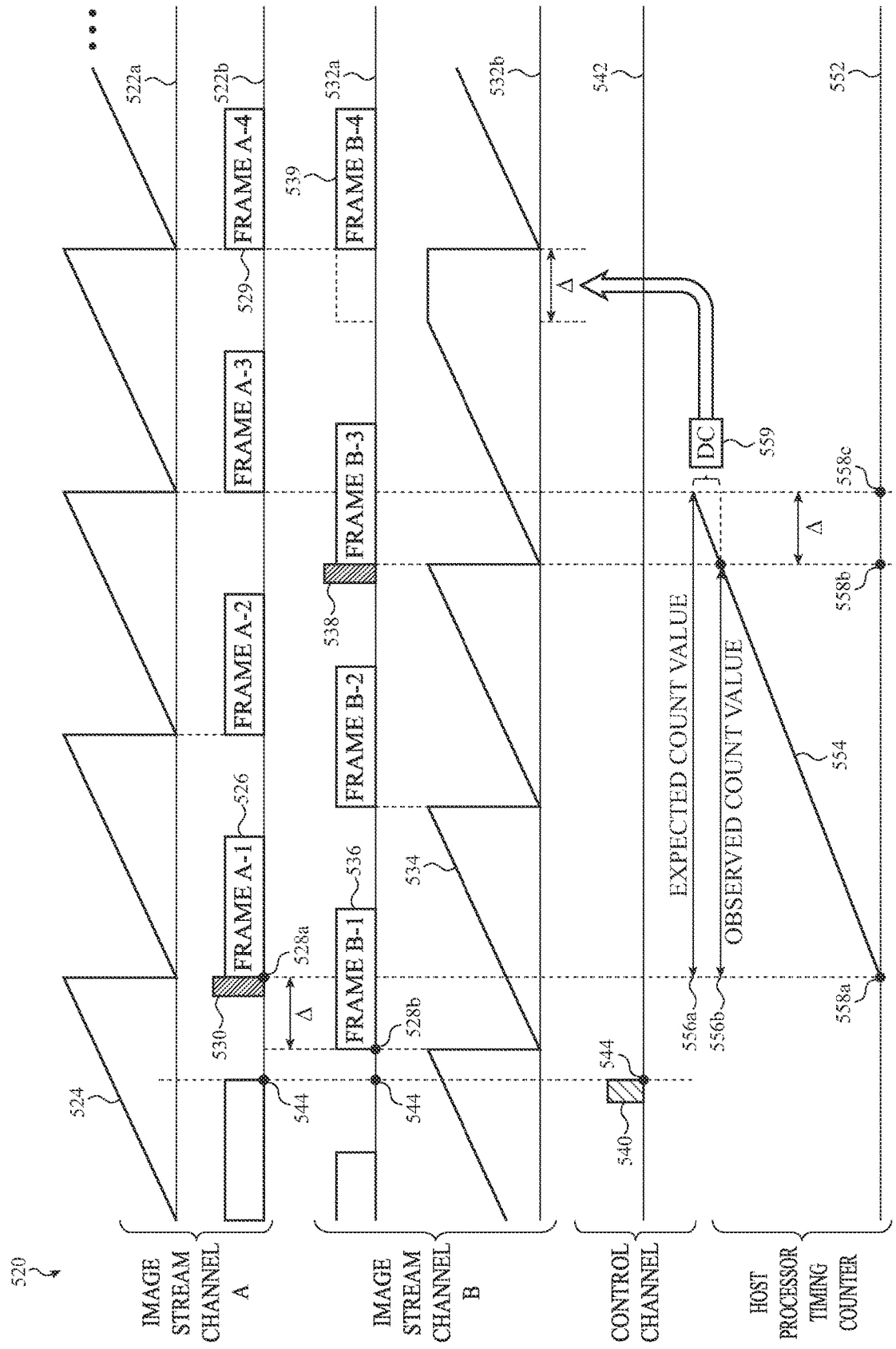
FIG. 5B illustrates a timing diagram of a method of sensor oscillator frequency control, such as for the system of FIG. 5A, according to an embodiment.

FIG. 5B is a timing diagram of signals transmitted as part of a method by the host processor 512 of the sensor system 500 to cause adjustments to better synchronize frame transmissions from sensor A 502 and sensor B 506. In the embodiments described here, for simplicity of explanation only, the period of each sensor's timing signal is assumed to equal, within a design tolerance, the period of a host timing signal generated by the host clock/oscillator 514.

A sequence of frame transmissions by sensor A 502 along image stream channel A is shown on the sensor A channel axis 522b. The timing of these frame transmissions may be controlled by the sensor A timing counter 504. Sensor A counting graph 524 shows the value of the sensor A timing counter 504 along the time axis 522a. Sensor A timing counter 504 may count clock cycles or other values of the timing signal produced by the sensor A clock/oscillator 503. At time instances at which the sensor A timing counter 504 has reached a certain value, sensor A transmits the next frame in the sequence.

Similarly, a sequence of frame transmissions by sensor B 506 along image stream channel B is shown on the sensor B channel axis 532a. The timing of these frame transmissions may be controlled by the sensor B timing counter 506. Sensor B counting graph 534 shows the value of the sensor B timing counter 508 along the time axis 532b. Sensor B timing counter 508 may count clock cycles or other values of the timing signal produced by the sensor B clock/ oscillator 507. At time instances at which the sensor B timing counter 508 has reached a certain value, sensor B transmits the next frame in the sequence.

As shown in FIG. 5B, initially the transmissions of frame A-1 526 by sensor A 502 and frame B-1 536 by sensor B 506 are not synchronized. The lack of synchronization between the transmission time 528a of frame A-1 526 and the transmission time 528b of frame B-1 536 is shown as the time difference A. In this case, the frame B-1 536 is transmitted ahead or earlier than frame A-1 526.

If the host processor 512 has detected a lack of synchronization, such as by a difference of arrival times of frames (in the respective sequences of frames) that exceeds a threshold, or if at a scheduled time, or for another reason, the host processor 512 may transmit, at time 544 (along the time axis 542), an initiate command 540 over the control channel 510 to sensor A 502 and sensor B 506.

Upon reception of the initiate command 540 at sensor A 502, sensor A 502 may apply a first marker 530, which may be a data packet, to frame A-1 526. As before, the first marker 530 may be prepended to frame A-1 526, or may be included as information within frame A-1 526. Upon reception of the initiate command 540 at sensor B 506, sensor B 506 begins a count to a fixed number of frames transmitted to the host processor 512. To the final frame of the fixed number of frames, sensor B 506 applies a second marker or data packet 538 to that final frame. As shown in FIG. 5B, the data packet 538 is applied to the third transmitted frame, frame B-3, following reception of the initiate command 540 by sensor B 506, though a different number of frames may have been counted.

At host processor 512, upon reception at time 558A of the first marker 530, the host timing counter 516 begins a count, such as of clock cycles of the host timing signal generated by the host clock/oscillator 514. In other embodiments, other timing signals may be counted. The value of the host timing counter 516 versus the time axis 552 is shown as host timing count value 554. As before, the host timing count value 554 graph may be step-wise increasing.

At time 558B, the host timing counter 516 receives the second marker 538 and ceases the count. If sensor A 502 and sensor B 506 had synchronized frame transmissions, the count would have been an expected count value 556a, and the second marker 538 would have been received at time 558c. For example, the expected count value 556a would be found as the product of the number of clock cycles per frame and the fixed number of frames until the second marker 538 is applied by sensor B 506. But due to the shown time offset A by which frame B-1 536 is transmitted ahead of frame A-1 526, the count has an observed count value 556b that is less than the expected count value 556a. The difference of count, DC 559, can be used to determine the time offset A.

The host processor 512 may transmit a command to sensor B 506 to cause a time delay A in transmission of a subsequent frame from sensor B 506. As shown, sensor B timing counter 508 may be stopped, or otherwise reset, so that transmission of the subsequent frame B-4 539 is delayed by the time offset A. Alternatively, the command may cause the timing counter 508 to continue counting by an extra count, EC 560, before resetting to a zero count, and so effect the needed time delay of the transmission of the subsequent frame B-4 539. Then the transmissions of frame B-4 539 and frame A-4 529 will be synchronized. Thereafter, the respective sequences of transmitted frames from sensor A 502 and sensor B 506 may be synchronized also.

In additional and/or alternative embodiments, during the synchronization process described, the frames transmitted before synchronization is achieved may not contain image, video or other sensor data. For example, the frames may contain content that may be used by the host processor to recognize a degree by which the sensors are not synchronized. Once synchronization has been achieved, the sensors may begin transmitting frames containing sensor data, such as image or video data. Further, one skilled in the art will recognize that during the synchronization process, the transmissions from the sensors may not be organized as frames, but may be other signaling methods. The sensors may add their respective markers in such signaling methods so as to allow the host processor's timing counter to determine the time offset A.

In the embodiments discussed in relation to FIG. 5B, transmission times of frames from each of sensor A 502 and sensor B 506 to the host processor 512 are assumed to be either equal or negligible. However, in additional and/or alternative embodiments, such as when there are different transmission times for frames from different sensors to a host processor, it may be desired to have frames arrive at the host processor effectively simultaneously. It will be clear to one skilled in the art how to adapt the embodiments described in relation to FIG. 5B so that the host processor can determine a time offset A by which transmission of frames from a first sensor may lead, or lag, transmission of frames from a second sensor so that frames from both sensors arrive effectively simultaneously at the host processor. Further, it will also be clear to one skilled in the art how to adapt the embodiments described in FIG. 5B so that frames from the sensors arrive at the host processor with designed staggered or offset arrival times.

Figure 6A:
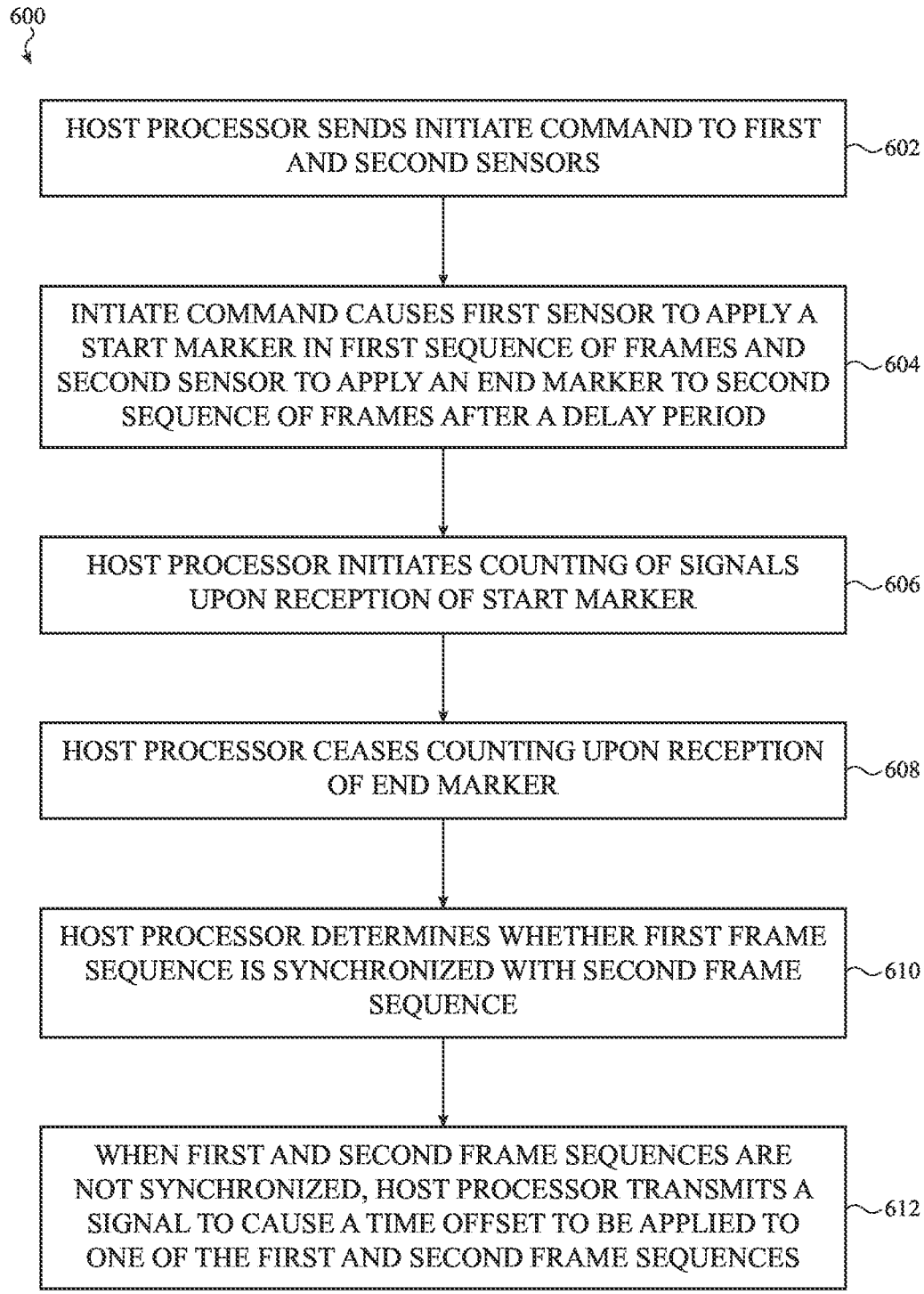
FIG. 6A is a flow chart of a method of sensor oscillator frequency control, according to an embodiment.

FIG. 6A is flow chart of a method 600 that may be used by a host processor to synchronize transmissions from two sensors of their respective sequences of frames.

At block 602 a host processor of the sensor system transmits an Initiate signal or command to first and second sensors of the sensor system. The Initiate signal may be transmitted over a control channel linking the host processor to the first and second sensors. The Initiate signal is sent so that it is received simultaneously at the first and second sensors, with simultaneity being within a specified tolerance.

At block 604, the Initiate command causes the first sensor to apply a Start marker within a first sequence of frames transmitted from the first sensor to the host processor. The first sequence of frames may be transmitted over a first communication channel linking the first sensor with the host processor, the first communication channel being separate from the control channel.

The Initiate command also causes the second sensor to apply an End marker within a second sequence of frames transmitted from the second sensor to the host processor. The second sequence of frames may be transmitted over a second communication channel linking the second sensor with the host processor, the second communication channel being separate from the control channel and the first communication channel. Alternatively, the first and second sensors may both use a common bus or communication channel over which to transmit their respective sequences of frames. The second sensor applies the End marker after a time delay from the point of time at which the second sensor, if it were the first sensor, would send the Start marker.

At block 606, the host processor initiates a counting or timing operation upon reception of the Start marker from the first sensor. The counting or timing operation may be based at least in part on either or both of a timing signal generated by a clock/oscillator internal to the host processor and another timing signal generated externally from the host processor.

At block 608, the host processor ceases the counting operation upon reception of the End marker from the second sensor.

At block 610 the host processor determines whether the first frame sequence is synchronized with the second frame sequence. The determination of synchronization may be determined based at least in part on a measured elapsed time from the reception of the Start marker to the reception of the End marker, as determined by the counting operation.

At block 612, when it is determined that the first frame sequence is not synchronized with the second frame sequence, the host processor transmits an adjustment signal to cause a time offset to be applied to frame transmissions in one of the first frame sequence and the second frame sequence.

Figure 6B:
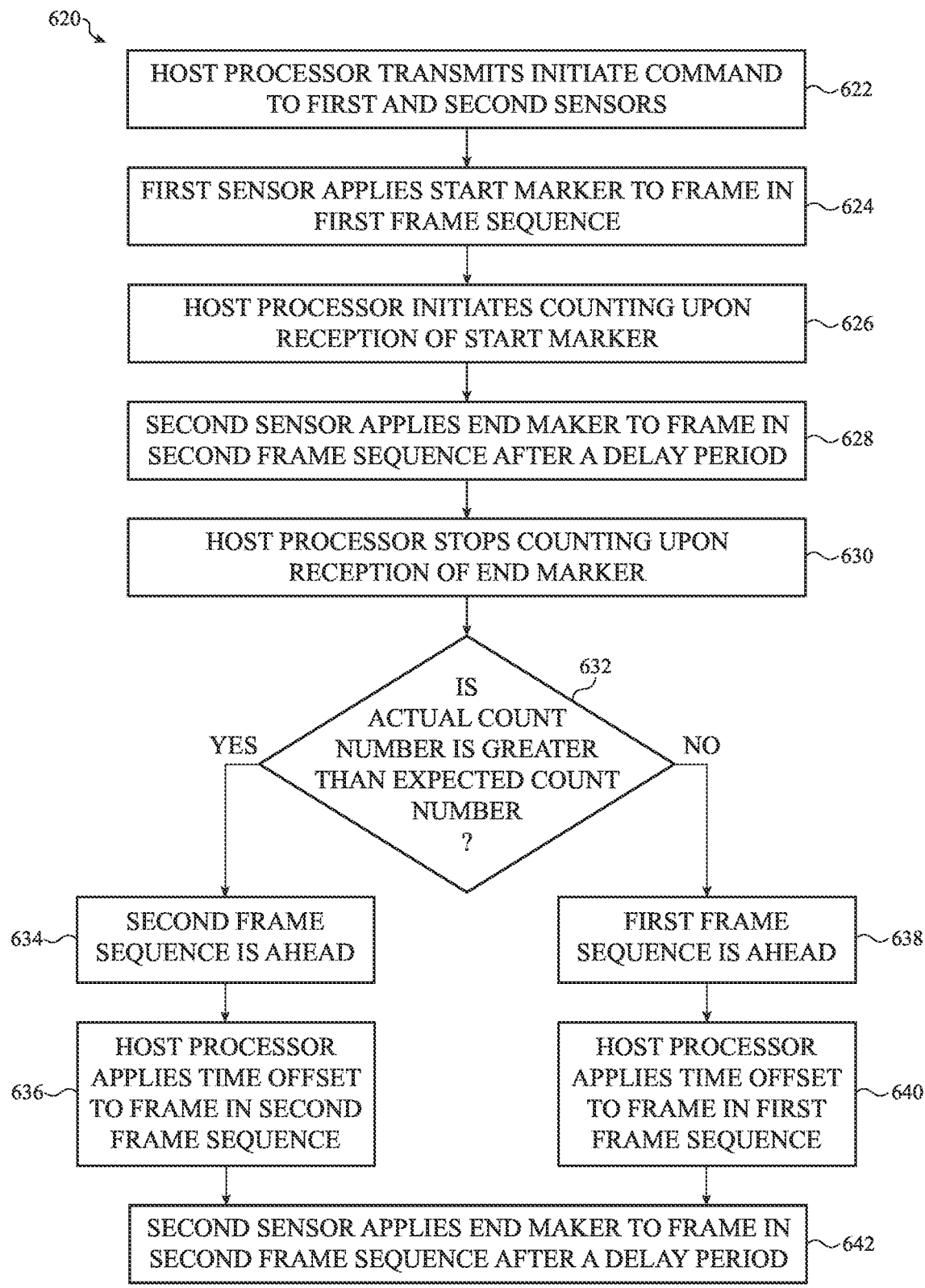
FIG. 6B is a flow chart of a method of sensor oscillator frequency control, according to an embodiment.

FIG. 6B is a flow chart of another method 620 that may be used, such as in a sensor system having at least two sensors communicatively linked with a host processor, to synchronize transmissions of the sensors' respective sequences of frames.

At block 622 the host processor transmits an Initiate command or signal to a first and a second sensor of the sensor system. The Initiate signal may be transmitted over a control channel linking the host processor to the first and second sensors. The Initiate signal is sent so that it is received simultaneously at the first and second sensors, with simultaneity being within a specified tolerance.

At block 624 the first sensor applies a Start marker to a frame in a first sequence of frames that is transmitted by the first sensor to the host processor.

At block 626, upon reception at the host processor of the Start marker, the host processor initiates a counting or timing process, such as of periods of a timing signal generated by a clock/oscillator of the host processor, or from another timing source.

At block 628 the second sensor applies an End marker to a second frame of a second sequence of frames being transmitted by the second sensor to the host processor. The End marker is applied by the second sensor to the second frame from the point of time at which the second sensor, if it were the first sensor, would send the Start marker.

At block 630, upon reception of the End marker at the host processor, the host processor ceases the counting process. The host processor may determine an expected count number for the counting process that would happen in the case that there was synchronization of the first and second frame sequences.

At block 632 the host processor may compare the actual count number of the counting process with the expected count number.

At block 634, if the actual count number is less than the expected count number, it may be concluded that the frames transmitted by the second sensor are transmitted with lead time, or ahead of, the transmission of respective frames transmitted by the first sensor.

At block 636, the host processor may send a signal, such as over a control channel, to cause a time offset to be inserted or included in the second frame sequence.

If at block 632 the actual count number is greater than the expected count number, then at block 638 it may be concluded that the frames transmitted by the first sensor are transmitted with lead time, or ahead of, the transmission of respective frames transmitted by the second sensor.

At block 640, the host processor may send a signal, such as over a control channel, to cause a time offset to be inserted or included in the first frame sequence.

At block 642, the first and second frame sequences may be in synchronization as a result of the inserted time offset.

The sensor system 500 of FIG. 5A was described as having two sensors. In additional and/or alternative embodiments, a sensor system may have more than two sensors. The following describes systems and methods of synchronization of transmission of frame sequences from the multiple sensors of such systems. Comparisons with respect the sensor system 500 will be described.

Figure 7A:
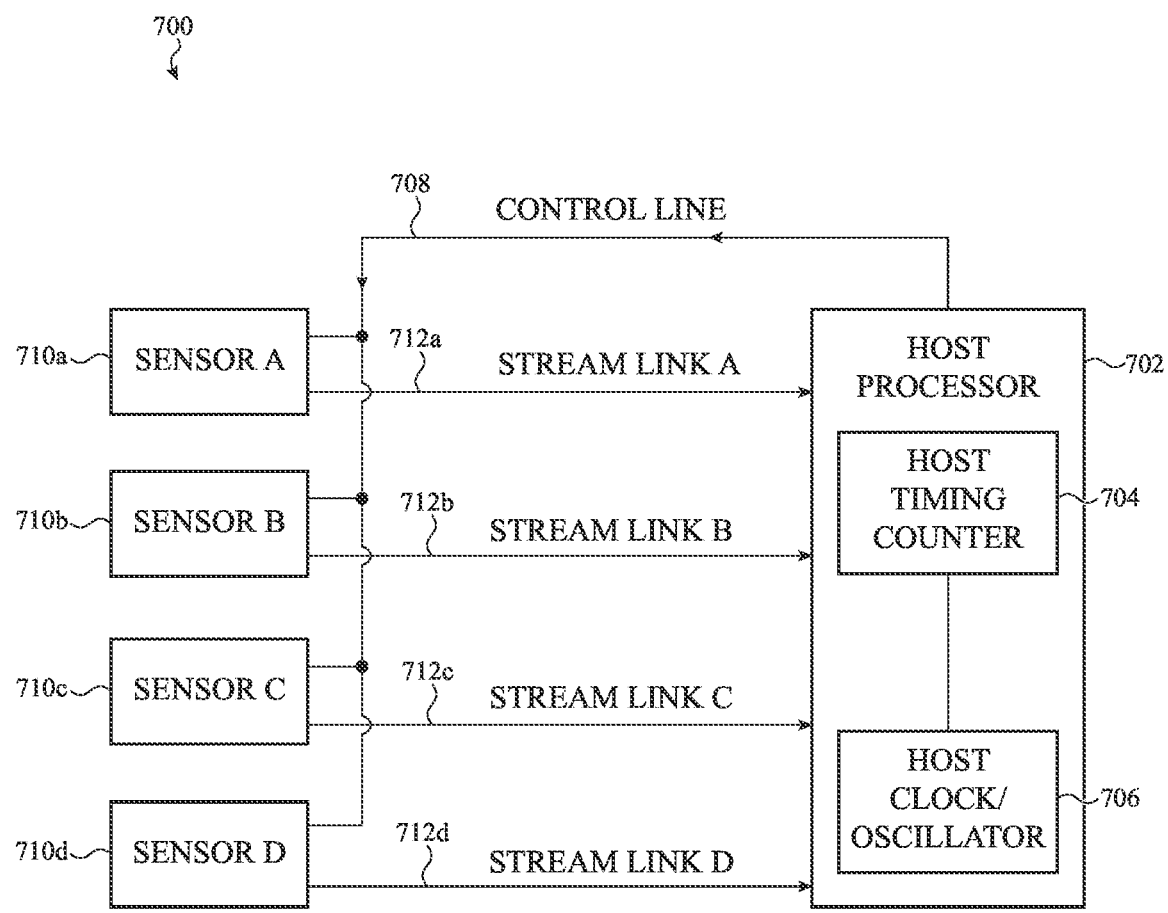
FIG. 7A illustrates a block diagram of a multi-sensor system having multiple sensors linked with a host processor, according to an embodiment.

FIG. 7A illustrates a block diagram of some components of a sensor system 700. While the sensor system 700 is, for expository purposes, shown with four image sensors, it will be clear to one skilled in the art how the embodiments now described apply to sensor systems having more or fewer sensors.

The sensor system 700 includes a host processor 702, which may include a host timing counter 704 that may be communicatively linked with a host clock/oscillator 706. These components may be as those described previously.

The sensor system 700 includes four sensors: sensor A 710*a*, sensor B 710*b*, sensor C 710*c*, and sensor D 710*d*. Sensor A 710*a* may transmit its sensor data as a sequence of frames to host processor 702 over the stream link A (S.L.A.) 712*a*. Sensor B 710*b* may transmit its sensor data as a sequence of frames to host processor 702 over the stream link B (S.L.B.) 712*b*. Sensor C 710*c* may transmit its sensor data as a sequence of frames to host processor 702 over the stream link C (S.L.C.) 712*c*. Sensor D 710*d* may transmit its sensor data as a sequence of frames to host processor 702 over the stream link D (S.L.D.) 712*d*.

The sensor system 700 may have a control channel 708 over the host processor 702 may transmit control or other signals to sensor A 710*a*, sensor B 710*b*, sensor C 710*c*, and sensor D 710*d*.

The sensor system 700 may include further components.

Figure 7B:
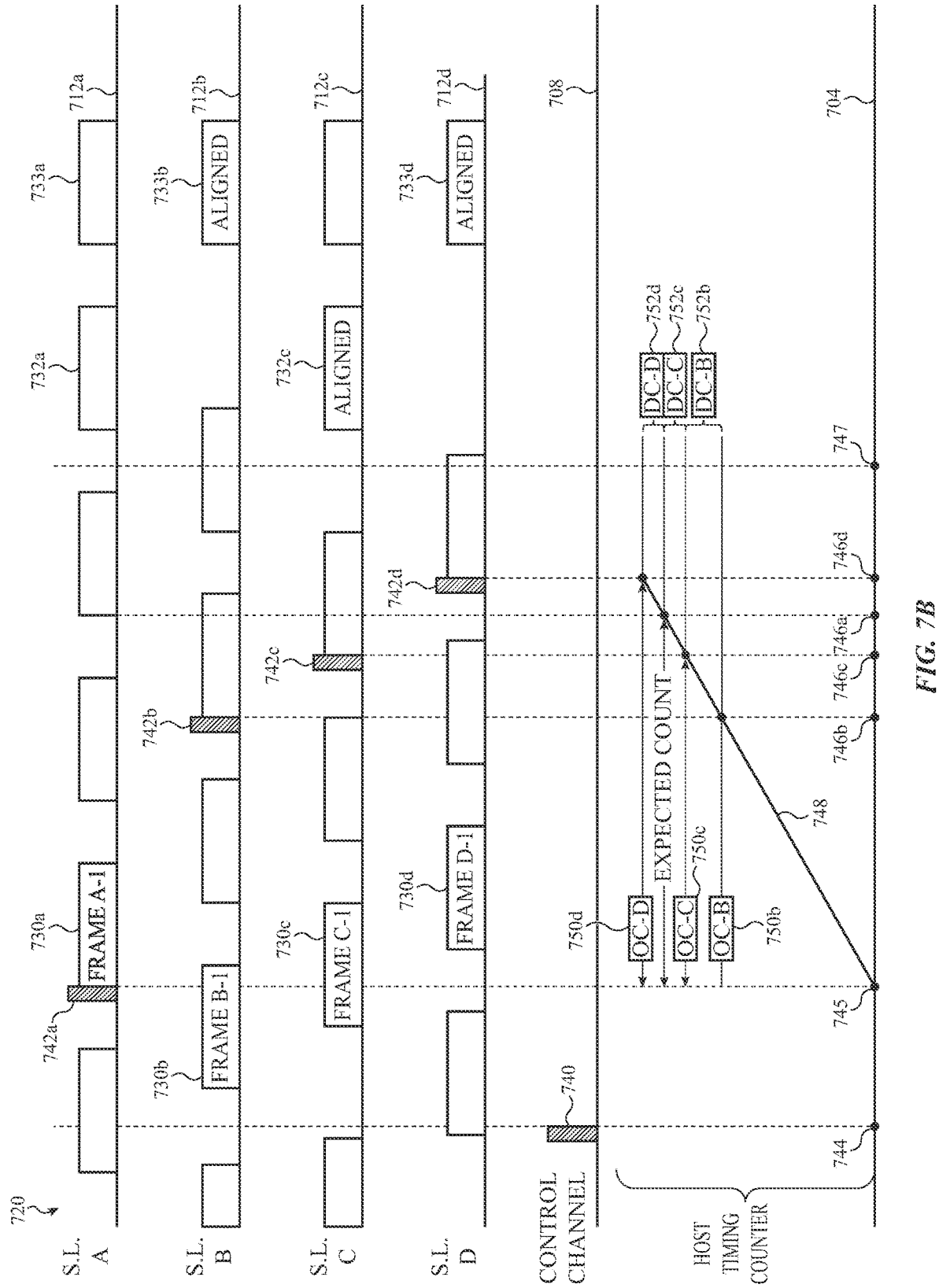
FIG. 7B illustrates a timing diagram of a method for synchronizing frame transmissions in a multi-sensor system, according to an embodiment.

FIG. 7B is a timing diagram 720 illustrating operations of a method of synchronizing transmission of frames across the transmitted sequences of frames of sensor A 710*a*, sensor B 710*b*, sensor C 710*c*, and sensor D 710*d*.

The host processor 702 may transmit an Initiate command to sensor A 710*a*, sensor B 710*b*, sensor C 710*c*, and sensor D 710*d* over the control channel 708 at time 744. When the Initiate command is received at sensor A 710*a*, it applies a first marker signal 742*a* to the next frame to be transmitted to the host processor 702, FRAME A-1 730*a*. When the Initiate command is received at sensor B 710*b*, it transmits a fixed number of following frames and then applies a second marker signal to the next frame after the fixed number of following frames. As shown, sensor B 710*b* counts two frames following reception of the Initiate command, FRAME B-1 730*b* and its successor, and then applies the second marker signal 742*b* to the next following frame.

Similarly, when the Initiate command 740 is received at sensor C 710*c*, it transmits a fixed number of following frames and then applies a third marker signal 742*c* to the next frame thereafter. As shown, sensor C 710*c* counts two frames following reception of the Initiate command 740, FRAME C-1 730*c* and its successor, and then applies the third marker signal 742*c* to the next following frame. When the Initiate command 740 is received at sensor D 710*c*, it transmits a fixed number of following complete frames and then applies a fourth marker signal 742*d* to the next frame thereafter. As shown, sensor D 710*d* counts two frames following reception of the Initiate command 740, FRAME D-1 730*d* and its successor, and then applies the fourth marker signal 742*d* to the next following frame. A different number of fixed frames to transmit before adding the marker signals may be used. The marker signals 742*a-d* may be prepended to the respective frames, or included as parts thereof.

When marker signal 742*a* on FRAME A-1 730*a* is received at the host processor 702, the host processor 702 may initiate at time 745 a counting by the host timing counter 704. The host timing counter 704 may count the number of periods of a host timing signal generated by the host clock/oscillator 706, or be otherwise based on the host timing signal. The count continues until all of the second, third, and fourth marker signals 742*b-d* have been received at the host processor 702, at respective times 746*b*, 746*c*, and 746*d*, producing the count value graph 748.

In the case that the four sensors 710*a-d* all begin transmission of frames synchronously (e.g., if FRAME B-1 730*b*, FRAME C-1 730*c*, and FRAME D-1, 730*d* had all been transmitted by their respective sensors at time 745) then their respective reception times 746*b*, 746*c*, and 746*d* would be the time 746*a*, which would be length of time of transmission of two frames (in the particular case shown) and any possible associated inter-frame intervals. The time interval from time 745 to time 746*a* is an expected time of reception of the second, third, and fourth marker signals, and the corresponding value of the counting is the expected count.

However, in the situation shown in FIG. 7B, FRAME B-1 730b starts to be transmitted before FRAME A-1 730a. This may cause the applied second marker 742b to be received at the host processor 702 at time 746b ahead of time 746a. The count value at the reception time 746b would be the observed count (OC-B) 750b. There would then be a difference between the expected count value and OC-B 750b, designated DC-B 752b in FIG. 7B.

Similarly, in FIG. 7B, FRAME C-1 730c starts to be transmitted before FRAME A-1 730a. This may cause the applied third marker 742c to be received at the host processor 702 at time 746c ahead of time 746a. The count value at the reception time 746c would be the observed count (OC-C) 750c. There would then be a difference between the expected count value and OC-750c, designated DC-C 752c in FIG. 7B.

Also, in FIG. 7B, FRAME D-1 730d starts to be transmitted after FRAME A-1 730a. This may cause the applied fourth marker 742d to be received at the host processor 702 at time 746d after time 746a. The count value at the reception time 746d would be the observed count (OC-D) 750d. There would then be a difference between the expected count value and OC-750d, designated DC-D 752d in FIG. 7B.

The host processor 702 may then use the differences DC-B 752b, DC-C 752c, and DC-D 752d to determine respective lead, or lag, times by which frame transmissions of sensor B 710b, sensor C 710c, and sensor D 710d are out of synchronization with the frame transmissions from sensor A 710a.

At time 747, the host processor 702 may transmit respective adjustment signals 754b, 754c, and 754d to sensor B 710b, sensor C 710c, and sensor D 710d, respectively, to add or insert a respective time delay before a transmission of a subsequent frame. In the situation shown in FIG. 7B, sensor C 710c receives its respective delay time and is able to delay transmission of the next frame, Aligned 732c, so that it is transmitted synchronously with frame 732a of sensor A 710a. Thereafter, sensor C 710c transmits frames of its sequence of frames synchronously with the frames of sensor A 710a.

At time 747, in the situation shown, sensor B 710b is in the process of transmitting a frame. Once that transmission is completed, sensor B 710b is then able to insert its respective time delay so that the frame Aligned 733b is transmitted synchronously with the transmission of frame 733a of sensor A. Thereafter, sensor B 710b transmits frames of its sequence of frames synchronously with the frames of sensor A 710a.

Similarly, at time 747 in the situation shown, sensor D 710d is in the process of transmitting a frame. Once that transmission is completed, sensor D 710d is then able to insert its respective time delay so that the frame Aligned 733d is transmitted synchronously with the transmission of frame 733a of sensor A. Thereafter, sensor D 710d transmits frames of its sequence of frames synchronously with the frames of sensor A 710a.

In this way all transmissions of sequences of frames of sensor A 710a, sensor B 710b, sensor C 710c, and sensor D 710d are brought into synchronous transmission.

The additional and/or alternative embodiments described with respect to FIG. 5B and sensor system 500 will be recognized by one skilled in the art as adaptable for the sensor system 700.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A sensor system comprising:
a host processor comprising a host clock; and
a sensor comprising a sensor clock and communicatively linked with the host processor wherein:
the sensor is operable to:
transmit a sequence of frames to the host processor;
apply a first marker to a first frame of the sequence of frames; and
apply a second marker to a second frame of the sequence of frames, the second frame subsequent to the first frame; and
the host processor is operable to:
determine a measured elapsed time between a reception of the first marker of the first frame and a reception of the second marker of the second frame, the determination of the measured elapsed time based at least in part on the host clock;
determine whether a discrepancy exists between the measured elapsed time and an expected elapsed time; and
in the case that the discrepancy is determined to exist, transmit an adjustment signal to the sensor to adjust an operation of the sensor clock.

2. The sensor system of claim 1, wherein:
the host clock comprises a host oscillator;
the host clock produces a periodic host timing signal based on a signal of the host oscillator; and
determination of the measured elapsed time is based at least in part on a count of periods of the periodic host timing signal occurring between the reception of the first marker and the reception of the second marker.

3. The sensor system of claim 1, wherein:
the sensor is an image sensor; and
the sequence of frames comprises at least two image frames captured by the image sensor.

4. The sensor system of claim 1, further comprising:
a first communication channel between the sensor and the host processor on which the sensor is operable to transmit the sequence of frames to the host processor; and
a second communication channel between the host processor and the sensor on which the host processor is operable to transmit the adjustment signal to the sensor.

5. The sensor system of claim 1, wherein:
the sensor clock comprises a sensor oscillator;
the sensor clock produces a periodic sensor timing signal based at least in part on a signal of the sensor oscillator; and
the adjustment signal is operable to adjust a period of the periodic sensor timing signal.

6. The sensor system of claim 1, wherein the host processor is further operable to transmit a start command to the sensor to cause the sensor to apply the first marker and the second marker.

7. A method of operation of a host processor to adjust a timing operation of a sensor to which the host processor is communicatively linked, comprising:

receiving a sequence of frames from the sensor;
identifying a first frame in the sequence of frames, the first frame having a first marker;
identifying a second frame, subsequent to the first frame, in the sequence of frames, the second frame having a second marker;
determining a measured elapsed time between the first marker and the second marker based at least in part on a host clock of the host processor;
determining a discrepancy between the measured elapsed time and an expected elapsed time between the first marker and the second marker; and
transmitting an adjustment signal to cause an adjustment of a timing operation of the sensor.

8. The method of claim 7, wherein:
the host processor comprises a host oscillator;
the host processor produces a periodic host timing signal based at least in part on a signal of the host oscillator;
the determination of the measured elapsed time is based at least in part on a count of periods of the periodic host timing signal between a detection of the first marker and a detection of the second marker; and
the first marker and the second marker are data packets prepended respectively to the first frame and the second frame.

9. The method of claim 8, wherein
the sensor includes a sensor oscillator;
the sensor produces a periodic sensor timing signal based at least in part on a signal of the sensor oscillator;
the adjustment signal causes the sensor to alter a period of the periodic sensor timing signal; and
the altered period of the periodic sensor timing signal is a multiple of a period of the periodic host timing signal.

10. The method of claim 7, further comprising:
receiving the sequence of frames from the sensor on a first communication channel; and
transmitting the adjustment signal to the sensor on a second communication channel.

11. The method of claim 7, further comprising transmitting a start command to the sensor, thereby causing the sensor to apply the first marker to the first frame and the second marker to the second frame.

12. A sensor system comprising:
a host processor comprising a host timing counter; and
a first sensor communicatively linked with the host processor and comprising a first sensor timing counter;
a second sensor communicatively linked with the host processor and comprising a second sensor timing counter;
wherein:
the first sensor is operable to:
transmit a first sequence of frames to the host processor over a first communication channel; and
apply a start marker to a first frame of the first sequence of frames;
the second sensor is operable to:
transmit a second sequence of frames to the host processor over a second communication channel; and
apply an end marker to a first frame of the second sequence of frames, the end marker applied subsequent to the first sensor applying the start marker to the first frame of the first sequence of frames;
the host processor is operable to:
initiate a counting by the host timing counter upon detection of the start marker in the received first frame of the first sequence of frames;
cease the counting by the host timing counter upon detection of the end marker in the received first frame of the second sequence of frames;
determine whether an offset exists between the first sensor timing counter and the second sensor timing counter; and
in the case that the offset exists, transmit to at least one of the first sensor or the second sensor an adjustment to be applied to at least one of the first sensor timing counter and the second sensor timing counter.

13. The sensor system of claim 12, wherein:
the host processor transmits an initiation command to the first sensor and to the second sensor;
the initiation command causes the first sensor to apply the start marker to the first frame of the first sequence of frames; and
the initiation command causes the second sensor to apply the end marker to the first frame of the second sequence of frames after a delay period.

14. The sensor system of claim 13, wherein the host processor transmits the initiation command to the first sensor and to the second sensor using a control communication channel separate from the first and second communication channels.

15. The sensor system of claim 12, wherein the counting by the host timing counter is based at least in part on a periodic host timing signal generated based at least on an output of an oscillator of the host processor.

16. The sensor system of claim 12, wherein the adjustment causes the first sensor timing counter and the second sensor timing counter to have synchronized initiation times.

17. A method of operation of a host processor linked with a first sensor over a first communication channel and a second sensor over a second communication channel, comprising:
transmitting an initiate command to the first sensor and the second sensor, the initiate command causing:
the first sensor to apply a start marker in a first sequence of frames transmitted from the first sensor to the host processor over the first communication channel; and
the second sensor to apply an end marker in a second sequence of frames transmitted from the second sensor to the host processor over the second communication channel, the application of the end marker occurring after a delay period;
initiating a counting of signals received at a host timing counter of the host processor upon reception of the start marker;
ceasing the counting of the signals by the host timing counter upon reception of the end marker;
determining whether the first sequence of frames is synchronized with the second sequence of frames based at least in part on the counting by the host timing counter; and
in the case that it is determined the first sequence of frames is not synchronized with the second sequence of frames, the host processor transmits a signal to cause a time offset to be applied to at least one of the first sequence of frames and the second sequence of frames.

18. The method of claim 17, wherein the initiate command is transmitted over a control channel separate from the first communication channel and the second communication channel.

19. The method of claim 17, wherein the signals received at the host timing counter are based at least in part on a periodic host timing signal generated at least in part on an output signal of an oscillator of the host processor.

20. The method of claim 19, wherein the time offset is based on a difference between an expected count number for the counting of the signals and an actual count number obtained in the counting of the signals.

* * * * *